(12) United States Patent
Kim

(10) Patent No.: US 11,669,644 B2
(45) Date of Patent: Jun. 6, 2023

(54) STORAGE DEVICE AND DATA DESTRUCTION METHOD THEREOF

(71) Applicant: SAMSUNG ELECTRONICS CO., LTD., Suwon-si (KR)

(72) Inventor: Yongwook Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/031,157

(22) Filed: Sep. 24, 2020

(65) Prior Publication Data

US 2021/0303736 A1 Sep. 30, 2021

(30) Foreign Application Priority Data

Mar. 30, 2020 (KR) .......................... 10-2020-0038093

(51) Int. Cl.
| | | |
|---|---|---|
| *G06F 21/00* | (2013.01) | |
| *G06F 21/79* | (2013.01) | |
| *G06F 21/60* | (2013.01) | |
| *G11C 29/42* | (2006.01) | |
| *G06F 13/40* | (2006.01) | |
| *G06F 21/64* | (2013.01) | |

(52) U.S. Cl.
CPC ............ *G06F 21/79* (2013.01); *G06F 13/409* (2013.01); *G06F 13/4068* (2013.01); *G06F 21/602* (2013.01); *G06F 21/64* (2013.01); *G11C 29/42* (2013.01)

(58) Field of Classification Search
None
See application file for complete search history.

(56) References Cited

U.S. PATENT DOCUMENTS

| | | |
|---|---|---|
| 7,085,857 B2 | 8/2006 | Rust et al. |
| 8,812,875 B1 | 8/2014 | Melvin |
| 9,323,958 B2 | 4/2016 | Mostovych |
| 9,467,288 B2 | 10/2016 | Obukhov et al. |
| 2010/0037063 A1 | 2/2010 | Chontos et al. |
| 2010/0185843 A1 | 7/2010 | Olarig et al. |
| 2016/0203086 A1 | 7/2016 | Ng et al. |
| 2019/0303293 A1* | 10/2019 | Byun .................. G06F 12/0246 |
| 2020/0159697 A1* | 5/2020 | Wood .................... H04L 9/0637 |

FOREIGN PATENT DOCUMENTS

| | | | |
|---|---|---|---|
| CN | 203204604 U | * | 9/2013 |
| JP | 2001014794 A | * | 1/2001 |
| JP | 2005063001 A | * | 3/2005 |
| JP | 2007-241800 A | | 9/2007 |
| JP | 2011-81739 A | | 4/2011 |
| JP | 2012-90231 A | | 5/2012 |

* cited by examiner

*Primary Examiner* — Andrew J Steinle
(74) *Attorney, Agent, or Firm* — Sughrue Mion, PLLC

(57) ABSTRACT

A storage device includes a non-volatile memory device, a memory controller, a secure element, and a wireless power received. The memory controller encrypts data using key information and stores the encrypted data in the non-volatile memory device, or reads the encrypted data from the non-volatile memory device, decrypts the read encrypted data using the key information, and outputs the decrypted data to an external device. The secure element stores the key information. The wireless power receiver, when the key information of the secure element is destroyed, receives wireless power from an external wireless device and provides the wireless power to the secure element.

17 Claims, 29 Drawing Sheets

STORAGE DEVICE AND DATA DESTRUCTION METHOD THEREOF

CROSS-REFERENCE TO RELATED APPLICATION

This application claims priority from Korean Patent Application No. 10-2020-0038093 filed on Mar. 30, 2020 in the Korean Intellectual Property Office, the disclosure of which is incorporated by reference herein in its entirety.

BACKGROUND

1. Field

The present disclosure relates to a storage device and a data destruction method thereof.

2. Description of Related Art

In general, important data is stored on a storage device such as a hard disk drive (HDD) or a solid state drive (SSD) mounted in a computer, a laptop, a server, or the like. Therefore, in the case of destroying computers, laptops, servers, or the like, internal data of storage devices thereof must be completely removed. Physical shredding has been used to completely remove data stored on such storage devices by physical destructions but physical destruction may be costly.

SUMMARY

It is an aspect to provide a storage device capable of deleting stored data at low cost, and a data destruction method thereof.

According to an aspect of one or more exemplary embodiments, there is provided a storage device comprising at least one non-volatile memory device; a memory controller configured to encrypt data using key information and store the encrypted data in the at least one non-volatile memory device, or configured to read the encrypted data from the at least one non-volatile memory device and decrypt the read encrypted data using the key information, and configured to output the decrypted data to an external device; a secure element configured to store the key information; and a wireless power receiver configured to, when the key information of the secure element is destroyed, receive wireless power from an external wireless device and to provide the wireless power to the secure element.

According to another aspect of one or more exemplary embodiments, there is provided a storage device comprising at least one non-volatile memory device; and a memory controller configured to control the at least one non-volatile memory device, wherein the memory controller includes at least one processor configured to control operation of the storage device; a buffer memory configured to temporarily store data; an error correcting circuit configured to generate a first error correction code of first data in a write operation and to generate second data using a second error correction code in a read operation; a cryptographic module configured to generate the first data by encrypting data using an encryption algorithm in the write operation or to decrypt the second data using the encryption algorithm in the read operation, and to perform a data destruction operation in response to a data destruction signal; a code memory configured to store code data for operating the memory controller; a host interface circuit configured to provide an interface function with an external device; a non-volatile memory interface circuit configured to provide an interface function with the at least one non-volatile memory device; and a wireless power receiver configured to receive wireless power from an external wireless device and to provide the wireless power to the cryptographic module when performing the data destruction operation.

According to another aspect of one or more exemplary embodiments, there is provided a data destruction method of a storage device including at least one non-volatile memory device, a memory controller configured to encrypt data using an encryption algorithm and store the encrypted data in the at least one non-volatile memory device or configured to read encrypted data from the at least one non-volatile memory device and decrypt the read encrypted data using the encryption algorithm, and a secure element configured to store the encryption algorithm or key information related to the encryption algorithm, the data destruction method comprising performing a sanitization operation on the at least one non-volatile memory device; and performing a data destruction operation in the secure element in response to a data destruction signal.

According to another aspect of one or more exemplary embodiments, there is provided a data destruction method comprising receiving, by each of a plurality of storage devices, a data destruction signal from a wireless device; and performing a data destruction operation in a secure element of each of the plurality of storage devices in response to the data destruction signal, wherein each of the plurality of storage devices receives wireless power from the wireless device and provides the received wireless power to the secure element, when performing the data destruction operation.

According to another aspect of one or more exemplary embodiments, there is provided a method of destructing data of a storage device, the method comprising receiving wireless power from an external device that is external to the storage device; receiving a data destruction signal from the external device; and performing, using the received wireless power, a data destruction operation in response to the data destruction signal.

BRIEF DESCRIPTION OF DRAWINGS

The above and other aspects will be more clearly understood from the following detailed description taken in conjunction with the accompanying drawings, in which.

DETAILED DESCRIPTION

Hereinafter, exemplary embodiments will be described in detail with reference to the accompanying drawings.

In general, even when a secure element (e.g., a security chip) storing important security information is separated from a storage device, the important security information may be acquired from the separated secure element without authorization. Therefore, when such a secure element is extracted, the secure element of the storage device must be destroyed to prevent leakage of internal information of the secure element. A storage device and a data destruction method according to various exemplary embodiments may safely protect data and may easily provide proof of destruction of the storage device when the storage device is destroyed. For example, the storage device according to exemplary various exemplary embodiments protects internal data thereof through a secure element (e.g., a security chip) extracted after destruction and simplifies a method of proof of destruction, whereby a reduction in a possibility of information leakage and cost for destruction may be expected.

Figure 1:
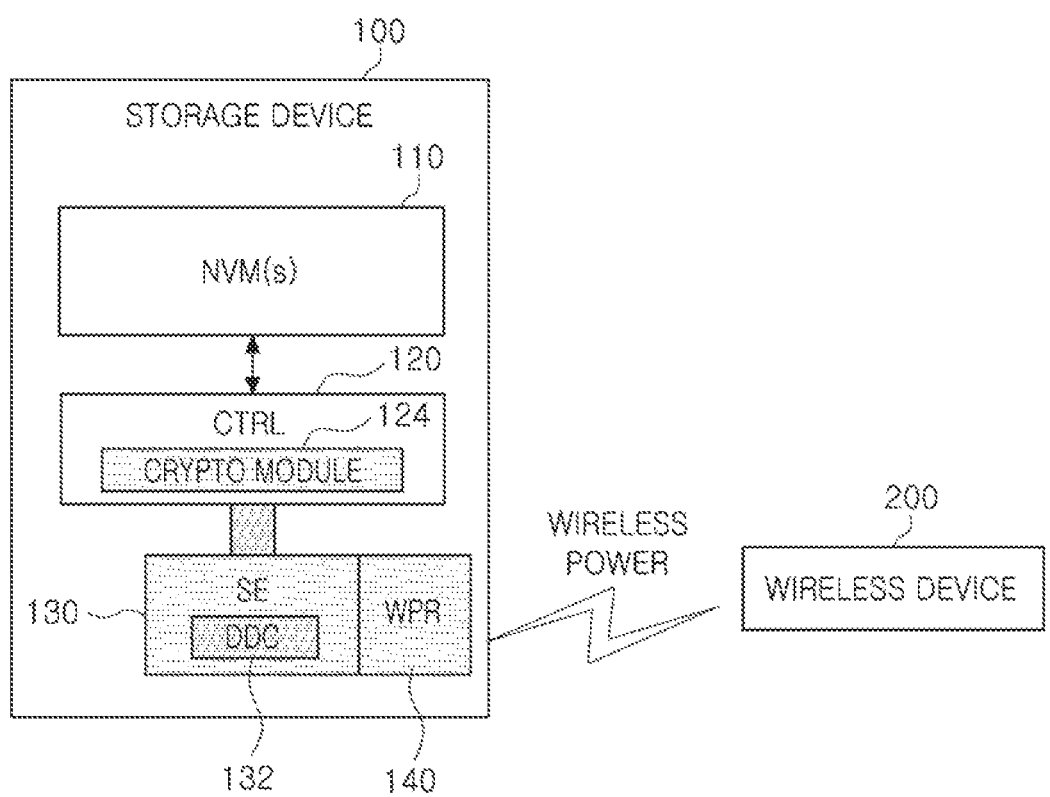
FIG. 1 is a view illustrating a storage device according to an exemplary embodiment.

FIG. 1 is a view illustrating a storage device 100 according to an exemplary embodiment. Referring to FIG. 1, the storage device 100 may include at least one non-volatile memory device NVM 110, a memory controller CTRL 120, a secure element SE 130, and a wireless power receiver WPR 140.

The storage device 100 may be realized to store user data. For example, the storage device 100 may be a solid state drive (SSD), a memory card (e.g., CompactFlash (CF), Secure Digital (SD), microSD, etc.), a universal serial bus (USB) storage device, or the like.

At least one non-volatile memory device 110 may be realized to store data. The non-volatile memory device 110 may include a NAND flash memory, a vertical NAND flash (VNAND) memory, a NOR flash memory, a resistive random access memory (RRAM), and a phase-change memory (PRAM), a magnetoresistive random access memory (MRAM), a ferroelectric random access memory (FRAM), a spin transfer torque random access memory (STTRAM), or the like. Also, the non-volatile memory device 110 may be realized as a three-dimensional (3D) array structure.

In an exemplary embodiment, the non-volatile memory device 110 may be realized to store encrypted data.

The memory controller CTRL 120 may be realized to control the non-volatile memory device 110 in response to a command or address from a host device. The memory controller 110 may transmit a command, an address, or a control signal CTRL to the non-volatile memory device 110, write data into the non-volatile memory device 110, or read data from the non-volatile memory device 110. For example, a command or an address provided from the host device may be a signal based on a communication protocol (e.g., a host interface) previously determined between the host device and the memory controller 120. In addition, a command, an address, and a control signal provided to the non-volatile memory device 110 may be a signal based on a communication protocol (e.g., a non-volatile interface) previously determined between the memory controller 120 and the non-volatile memory device 110.

In addition, the memory controller 120 may encrypt data received from the host device based on an encryption algorithm and write the encrypted data into the non-volatile memory device 110. Also, the memory controller 120 may be realized to decrypt the encrypted data read from the non-volatile memory device 110 based on an encryption algorithm. Here, the encryption algorithm may be a symmetric encryption algorithm or an asymmetric encryption algorithm. In an exemplary embodiment, the symmetric encryption algorithm may be data encryption standard (DES), advanced encryption standard (AES) (AES-128, AES-192, AES-256, etc.), SEED, RC4, Twofish, Serpent, Blowfish, CASTS, 3DES, IDEA, or the like. In an exemplary embodiment, the asymmetric encryption algorithm may be Diffie-Hellman key exchange, DSS, ElGamal, ECC, RSA, or the like.

In an exemplary embodiment, the memory controller 120 may include a cryptographic module CRYPTO MODULE 124 performing an encryption operation or a decryption operation based on an encryption algorithm. Here, the crypto module may be realized in hardware, software, or firmware.

The secure element SE 130 may be connected to the memory controller 120 and may be realized to store the encryption algorithm and/or store key information for performing the encryption algorithm. For example, in some exemplary embodiments, the secure element SE 130 may be a security chip. Here, the key information may include encryption key information or decryption key information. In some exemplary embodiments, the secure element 130 may be connected to the memory controller 120 by a flexible printed circuit board (PCB). In some exemplary embodiments, the secure element 130 may be realized to be simply extracted from the memory controller 120 by the user.

In addition, the secure element 130 may be realized to internally perform a data destruction operation in response to a data destruction request signal. Here, the data destruction operation may include an operation of deleting data related to the encryption algorithm stored on the secure element 130. The secure element 130 may include a data destruction circuit (DDC) 132 that is realized to perform the data destruction operation.

In an exemplary embodiment, the secure element 130 and the storage device 100 may be realized to have identification information such as a barcode/QR code/RFID, or the like attached thereto for mutual identification.

The secure element 130 illustrated in FIG. 1 is disposed outside the memory controller CTRL 120. However, exemplary embodiments are not limited thereto. For example, in some exemplary embodiments, the secure element may be embedded in the memory controller CTRL 120.

The wireless power receiver WPR 140 may be realized to be connected to the secure element 130, receive wireless power from an external wireless device 200, and provide the received power to the secure element 130. In an exemplary embodiment, the wireless power receiver 140 may provide power to the secure element 130 during the data destruction operation of the secure element 130. That is, the secure element 130 may receive wireless power from the external wireless device 200 without a separate power source provided on the flexible PCB or otherwise provided that provides power to the secure element 130, and perform the data destruction operation using the wireless power.

In an exemplary embodiment, the power receiver 140 may include an antenna for power communication. For example, the antenna for power communication may receive wireless power using a near-field communication (NFC) signal.

The storage device 100 according to an exemplary embodiment may store encryption/decryption key information in the secure element 130. The encryption/decryption key information is used for storing data in the storage device 100. For example, the encryption/decryption key information may be used for encrypting/decrypting data that is stored in the storage device 100. The encryption/decryption key information can be permanently destroyed when the secure element 130 is physically extracted in order to protect personal information. In addition, according to some exemplary embodiments, destruction of the storage device 100 (in the sense that the data stored in the storage device 100 is rendered unreadable/unusable) may be proven by confirming pair matching between the storage device 100 and the extracted secure element 130 using a barcode, a QR code, an RFID, etc. In addition, according to some exemplary embodiments, internal key information of the secure element 130 may be deleted using NFC power transfer without a separate internal power so that the storage device 100 may be re-used to store personal information.

In some exemplary embodiments, the non-volatile memory device 110 illustrated in FIG. 1 may be generally divided into an overwritable memory (typically, PRAM/MRAM) and a non-overwritable memory (NAND flash memory).

Figure 2:
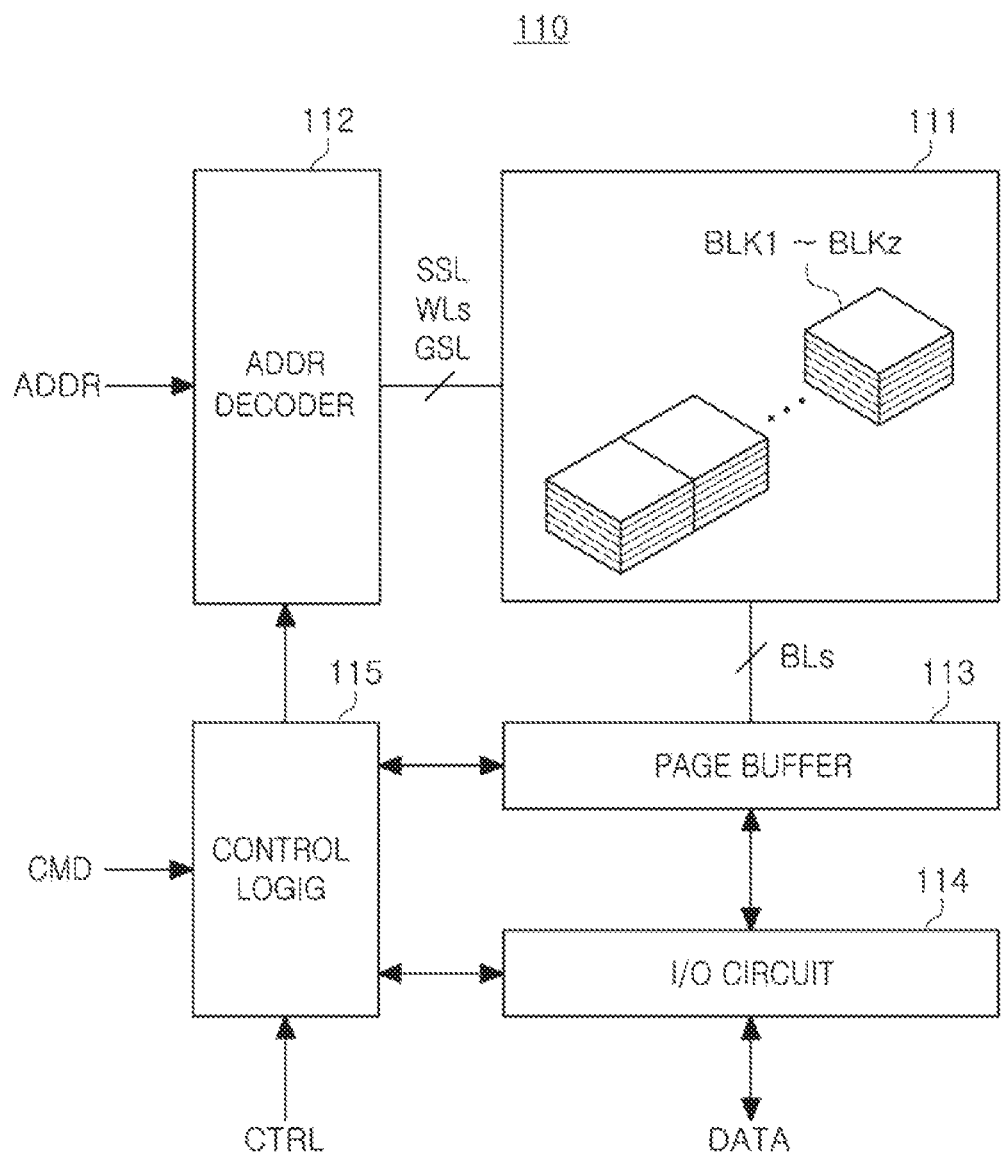
FIG. 2 is a view illustrating an example of a non-volatile memory device of the storage device illustrated in FIG. 1.

FIG. 2 is a view illustrating an example of the non-volatile memory device NVM 110 of the storage device illustrated in FIG. 1. The non-volatile memory device 110 may include a memory cell array 111, an address array 112, a page buffer 113, an input/output (I/O) circuit 114, and control logic 115.

The memory cell array 111 may include a plurality of memory blocks BLK1-BLKz. Each of the plurality of memory blocks may include a plurality of cell strings. Each of the plurality of cell strings may include a plurality of memory cells. The plurality of memory cells may be connected to a plurality of word lines WLs. Each of the plurality of memory cells may include a single level cell (SLC) storing 1 bit or a multi-level cell (MLC) storing at least 2 bits. The address array 112 may be connected to the memory cell array 111 through the plurality of word lines WLs, at least one string select line SSL, and at least one ground select line GSL. The address array 112 may receive a logical address from the outside, decode the received logical address, and drive the plurality of word lines WLs. For example, an address ADDR may represent a physical address of the non-volatile memory device 110 converted from the logical address.

The page buffer 113 may be connected to the memory cell array 111 through a plurality of bit lines BLs. The page buffer 113 may be realized to control the bit lines BL so that data DATA received from the I/O circuit 114 is stored on the memory cell array 111 under the control of the control logic 115. The page buffer 113 may read data stored on the memory cell array 111 and provide the read data to the I/O circuit 114 under control of the control logic 115. In an exemplary embodiment, the page buffer 113 may receive data in units of pages from the I/O circuit 114 or read data in units of pages from the memory cell array 111.

The I/O circuit 114 may be realized to receive the data DATA from an external device and provide the received data DATA to the page buffer 113.

The control logic 115 may be realized to receive a command CMD or at least one control signal CTRL from the outside and control the address array 112, the page buffer 113, and the I/O circuit in response to the received signals. For example, the control logic 115 may control other components so that the data DATA is stored on the memory cell array 111 in response to the signals CMD and CTRL. In addition, the control logic 115 may control other components so that the data DATA stored on the memory cell array 111 is transmitted to an external device in response to the signals CMD and CTRL. The control signal CTRL may be a signal provided from the memory controller 120 (see FIG. 1) to control the non-volatile memory device 110.

The control logic 115 may generate various voltages required for the non-volatile memory device 110 to operate. For example, the control logic 115 may generate a plurality of program voltages, a plurality of pass voltages, a plurality of selected read voltages, a plurality of unselected read voltages, a plurality of erase voltages, and a plurality of verify voltages. The control logic 115 may provide various generated voltages to the address array 112 or to a substrate of the memory cell array 111.

Figure 3:
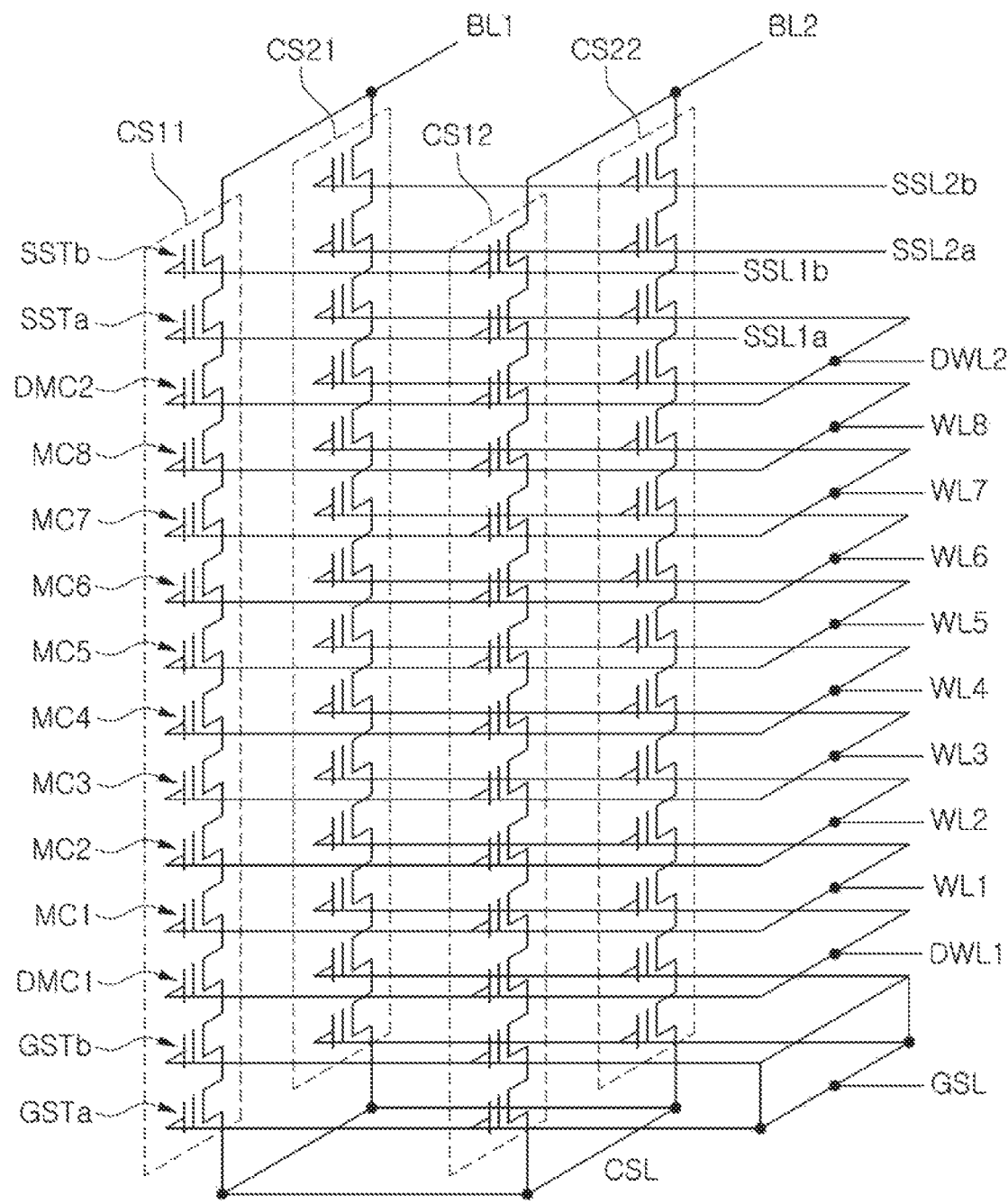
FIG. 3 is a view illustrating an example of a memory block of the non-volatile memory device illustrated in FIG. 2.

FIG. 3 is a view illustrating a circuit for a memory block illustrated in FIG. 2. Referring to FIG. 3, a memory block BLK may include a plurality of cell strings CS11, CS12, CS21, and CS22.

The plurality of cell strings CS11, CS12, CS21, and CS22 may be arranged in a row direction and a column direction to form rows and columns. For example, the cell strings CS11 and CS12 may be connected to string select lines SSL1a and SSL1b to form a first row. The cell strings CS21 and CS22 may be connected to string select lines SSL2a and SSL2b to form a second row. For example, the cell strings CS11 and CS21 may be connected to a first bit line BL1 to form a first column. The cell strings CS12 and CS22 may be connected to a second bit line BL2 to form a second column.

Each of the plurality of cell strings CS11, CS12, CS21, and CS22 may include a plurality of cell transistors. For example, each of the plurality of cell strings CS11, CS12, CS21, and CS22 may include string select transistors SSTa and SSTb, a plurality of memory cells MC1 to MC8, ground select transistors GSTa and GSTb, and dummy memory cells DMC1 and DMC2. For example, each of the plurality of cell transistors included in the plurality of cell strings CS11, CS12, CS21, and CS22 may be a charge trap flash (CTF) memory cell.

The plurality of memory cells MC1 to MC8 may be connected in series and stacked in a height direction perpendicular to a plane formed by the row direction and column direction. The string select transistors SSTa and SSTb may be connected in series, and the string select transistors SSTa and SSTb connected in series may be provided between the plurality of memory cells MC1 to MC8 and the bit line BL. The ground select transistors GSTa and GSTb are connected in series, and the ground select transistors GSTa and GSTb connected in series may be provided between the plurality of memory cells MC1 to MC8 and a common source line CSL.

In an exemplary embodiment, a first dummy memory cell DMC1 may be provided between the plurality of memory cells MC1 to MC8 and the ground select transistors GSTa and GSTb. In an exemplary embodiment, a second dummy memory cell DMC2 may be provided between the plurality of memory cells MC1 to MC8 and the string select transistors SSTa and SSTb. The ground select transistors GSTa and GSTb of the cell strings CS11, CS12, CS21, and CS22 may be commonly connected to the ground select line GSL. In an exemplary embodiment, ground select transistors of the same row may be connected to the same ground select line, and ground select transistors of different rows may be connected to different ground select lines. For example, the first ground select transistors GSTa of the cell strings CS11 and CS12 of the first row may be connected to the first ground select line, and the first ground select transistors GSTa of the cell strings CS21 and CS22 of the second row may be connected to the second ground select line.

In an exemplary embodiment, although not shown, the ground select transistors provided at the same height from the substrate may be connected to the same ground select line, and ground select transistors provided at different heights may be connected to the other ground select line. For example, the first ground select transistors GSTa of the cell strings CS11, CS12, CS21, and CS22 may be connected to the first ground select line, and the second ground select transistors GSTb may be connected to the second ground select line. Memory cells at the same height from the substrate (or ground select transistors GSTa and GSTb) may be commonly connected to the same word line, and memory cells at different heights may be connected to different word lines. For example, the first to eighth memory cells MC1 to MC8 of the cell strings CS11, CS12, CS21, and CS22 may be commonly connected to the first to eighth word lines WL1 to WL8, respectively.

It should be understood that the block BLK illustrated in FIG. 3 is merely an example of a block of a non-overwritable NAND flash memory. Exemplary embodiments are not particularly limited and other block BLK structures may be used in some exemplary embodiments.

Figure 4:
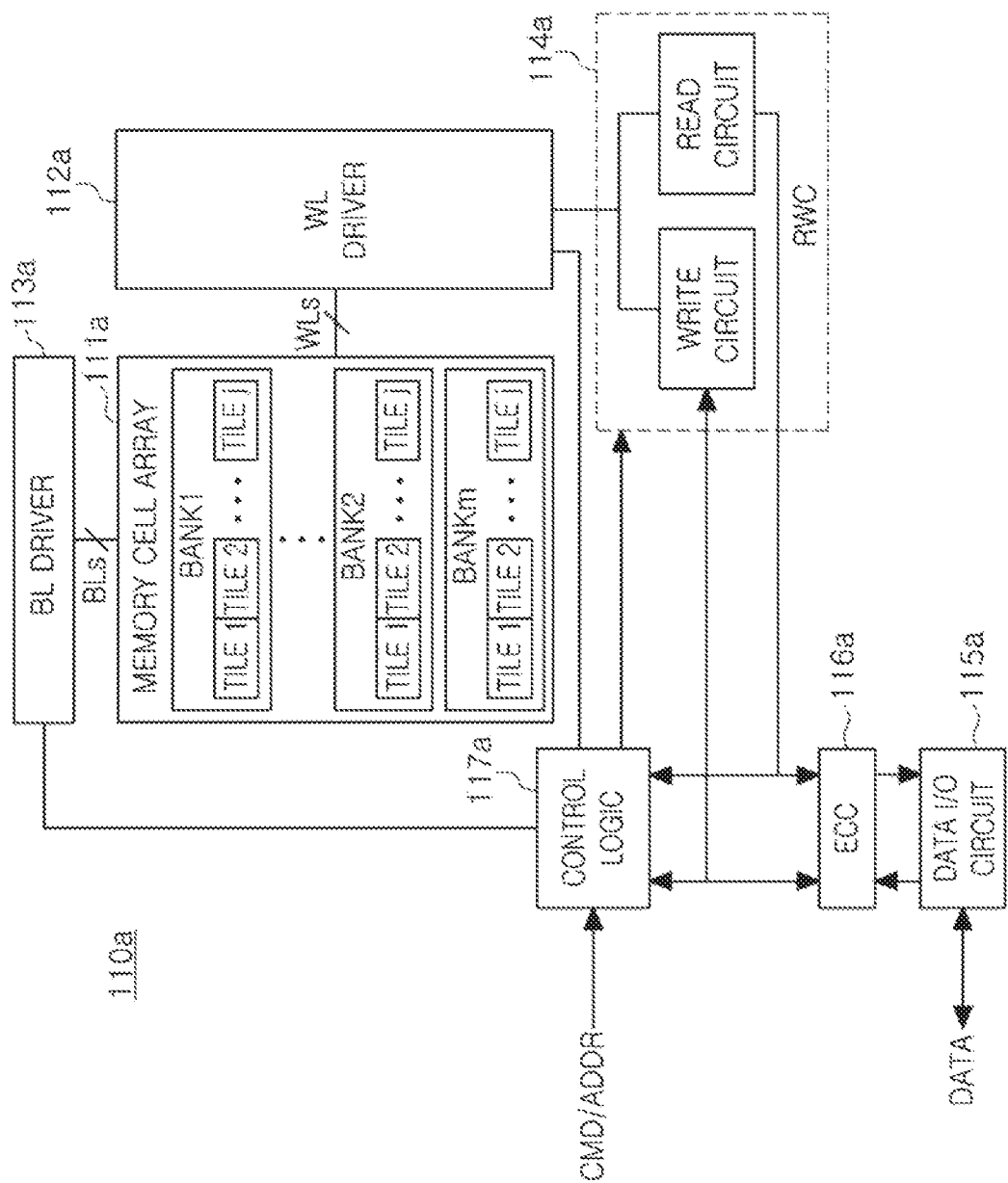
FIG. 4 is a view illustrating another example of a non-volatile memory device of the storage device illustrated in FIG. 1.

FIG. 4 is a view illustrating another example of a non-volatile memory device of the storage device 100 illustrated in FIG. 1, according to another exemplary embodiment. Referring to FIG. 4, a non-volatile memory device 110a may include a memory cell array 111a, a word line driver 112a, a bit line driver 113a, a read/write circuit RWC 114a, a data input/output (I/O) circuit 115a, an error correcting circuit ECC 116a, and a control logic 117a.

The memory cell array 111a may be connected to the word line driver 112a through a plurality of word lines WLs and may be connected to a bit line driver 113a through a plurality of bit lines BLs.

The memory cell array 111a may include a plurality of banks Bank 1 to Bank m (where m is an integer of 2 or greater). Each of the plurality of banks may include a plurality of tiles Tile 1 to Tile j (j is an integer of 2 or greater). Each of the plurality of tiles may include a plurality of memory cells connected to the plurality of word lines WLs and the plurality of bit lines BLs. Here, the memory cells may be connected between the word lines and the bit lines, respectively. The memory cell may store at least one bit using a resistance material.

The word line driver 112a may be connected to the memory cell array 111a through the word lines WLs. The word line driver 112a may include at least one row decoder. Here, the row decoder may select one of the word lines using a row address under the control of the control logic 117a. Also, the word line driver 112a may apply a word line voltage to the selected word line. Here, the word line voltage may include a read word line voltage, a write word line voltage, or the like. Although not shown, the word line driver 112a may include a voltage generating circuit that generates these word line voltages.

The bit line driver 113a may be connected to the memory cell array 111a through the bit lines BLs. The bit line driver 113a may include at least one column decoder. Here, the column decoder may select one of the bit lines using a column address under the control of the control logic 117a. Also, the bit line driver 113a may apply a bit line voltage to the selected bit line. Here, the bit line voltage may include a read voltage, a set bit line voltage, a reset bit line voltage, or the like. Although not shown, the bit line driver 113a may include a voltage generating circuit that generates these bit line voltages.

The read/write circuit RWC 114a may perform a read operation or a write operation on the memory cell array 111a under the control of the control logic 117a. The read/write circuit RWC 114a may include a write circuit and a read circuit.

The write circuit may be connected to the word line driver 112a and the bit line driver 113a. The write circuit may be realized to perform the write operation (set operation or reset operation) on a memory cell connected to a selected bit line and a selected word line under the control of the control logic 117a. For example, the write circuit may apply the word line voltage to the selected word line and apply the bit line voltage to the selected bit line in response to a write control signal from the control logic 117a. In an exemplary embodiment, the write circuit may generate a set pulse or the reset pulse corresponding to data to be written during the write operation and apply the set pulse or reset pulse to the selected word line/bit line. In an exemplary embodiment, when writing data into the selected memory cell, the write circuit may determine a write current according to resistance of the selected memory cell.

The read circuit may be realized to read data of a memory cell connected to a selected bit line and a selected word line under the control of the control logic 117a. For example, the read circuit may read data from the memory cell connected to the selected bit line and the selected word line in response to a read control signal from the control logic 117a. In an exemplary embodiment, the read circuit may detect a voltage difference between a voltage of the selected word line/bit line and a reference voltage and perform a sensing operation to distinguish between ON/OFF cells according to the sensed voltage difference.

The data I/O circuit 115a may be realized to transfer write data received from an external device (e.g., a memory controller) to data latches of the control logic 117a under the control of the control logic 117a during the write operation. Also, the data I/O circuit 115a may be realized to output data read from data registers to an external device (e.g., a memory controller) during the read operation. In an exemplary embodiment, the data I/O circuit 115a may be realized to input/output data in units of sectors.

The error correcting circuit ECC 116a may generate an error correction code (or parity, low density parity check (LDPC) code) by receiving write data from the data I/O circuit 115a during the write operation. Thereafter, the write data and a code word having the error correction code may be stored on a memory cell array corresponding to a write address. In addition, the error correcting circuit 116a may recover an error of read data during the read operation using the error correction code. For example, the code word is read from the memory cell array corresponding to the read address, and syndromes may be generated from the read code word. The error of the read code word may be corrected using the syndromes.

The control logic 117a may be realized to control an overall operation of the non-volatile memory device 110a. The control logic 117a may control the word line driver 112a, the bit line selection circuit 113a, and the read/write circuit RWC 114a, the data I/O circuit 115a, or the error correcting circuit ECC 116a in response to a command CMD, address ADDR, or control signals input from the outside. In an exemplary embodiment, the control logic 117a may select one of a plurality of write modes and perform a write operation according to the selected write mode. In an exemplary embodiment, the plurality of write modes may include a normal mode, a data comparison write (DCW) mode, an aggressive data comparison write (aDCW) mode, and/or a read skip data compare mode (read skip aDCW) mode, and the write operation may be performed in one of the modes. Here, the normal mode is a mode not reflecting a resistance drift, the DCW mode is a mode reflecting the resistance drift for a reset state, and the aDCW mode and the read skip aDCW mode are modes reflecting resistance drift both in a set state and reset state.

Figure 5:
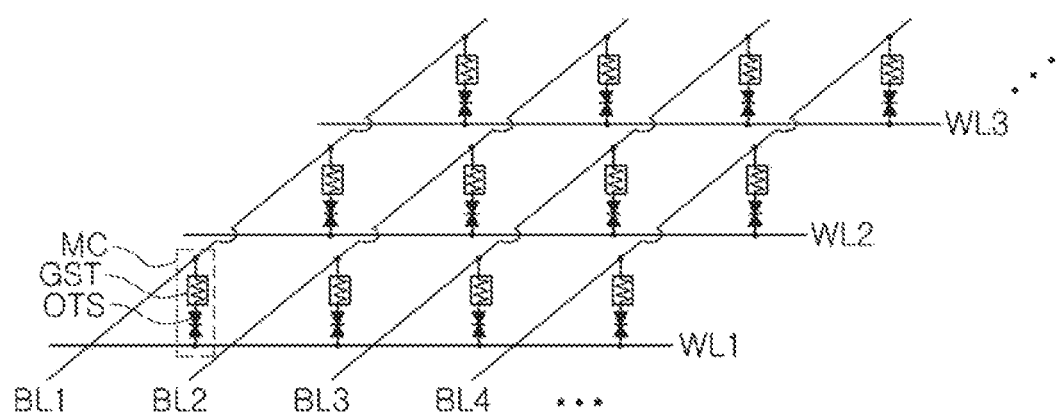
FIG. 5 is a view illustrating a memory cell array of the non-volatile memory device illustrated in FIG. 4.

FIG. 5 is a view illustrating a memory cell array of the non-volatile memory device illustrated in FIG. 4. Referring to FIG. 5, a tile of the memory cell array 111a may be realized as a cross point structure. Here, the cross point structure refers to a structure in which one resistive memory cell MC is formed in a region where one line and another line intersect each other. For example, a bit lines BL1 to BL4 extend in a first direction, a word lines WL1 to WL3 extend in a second direction to intersect the bit lines BL1 to BL4, and resistive memory cells MC may be formed in regions where the bit lines BL1 to BL4 and the word lines WL1 to WL3 intersect each other.

As illustrated in FIG. 5, the memory cell MC may include a variable resistor GST and a switching element OTS. In an exemplary embodiment, the variable resistor (GST) may be a phase change material. For example, as the phase change material, various materials such as GaSb, InSb, InSe, $Sb_2Te_3$, GeTe in which two elements are combined, GeSbTe, GaSeTe, InSbTe, $SnSb_2Te_4$, InSbGe in which three elements are combined, AgInSbTe, (GeSn)SbTe, GeSb(SeTe), $TesiGe_{1.5}Sb_2S_2$ in which four elements are combined, or the like may be used. In another exemplary embodiment, a variable resistor R may include perovskite compounds, transition metal oxide, magnetic materials, ferromagnetic materials, or antiferromagnetic materials, instead of the phase change material.

The switching element OTS may include an obonic threshold switch. The switching element may include a material similar to germanium-antimony-telluride (GST) ($Ge_2Sb_2Te_5$). For example, the obonic threshold switch is a combination of selenium (Se), arsenic (As), Ge (germanium), and Si (silicon), and may include a chalcogenide that changes crystal and amorphous states.

It should be understood that the memory cell illustrated in FIG. 5 is only an example of an overwritable PRAM. Exemplary embodiments are not particularly limited and other memory cell structures may be used in some exemplary embodiments.

Figure 6:
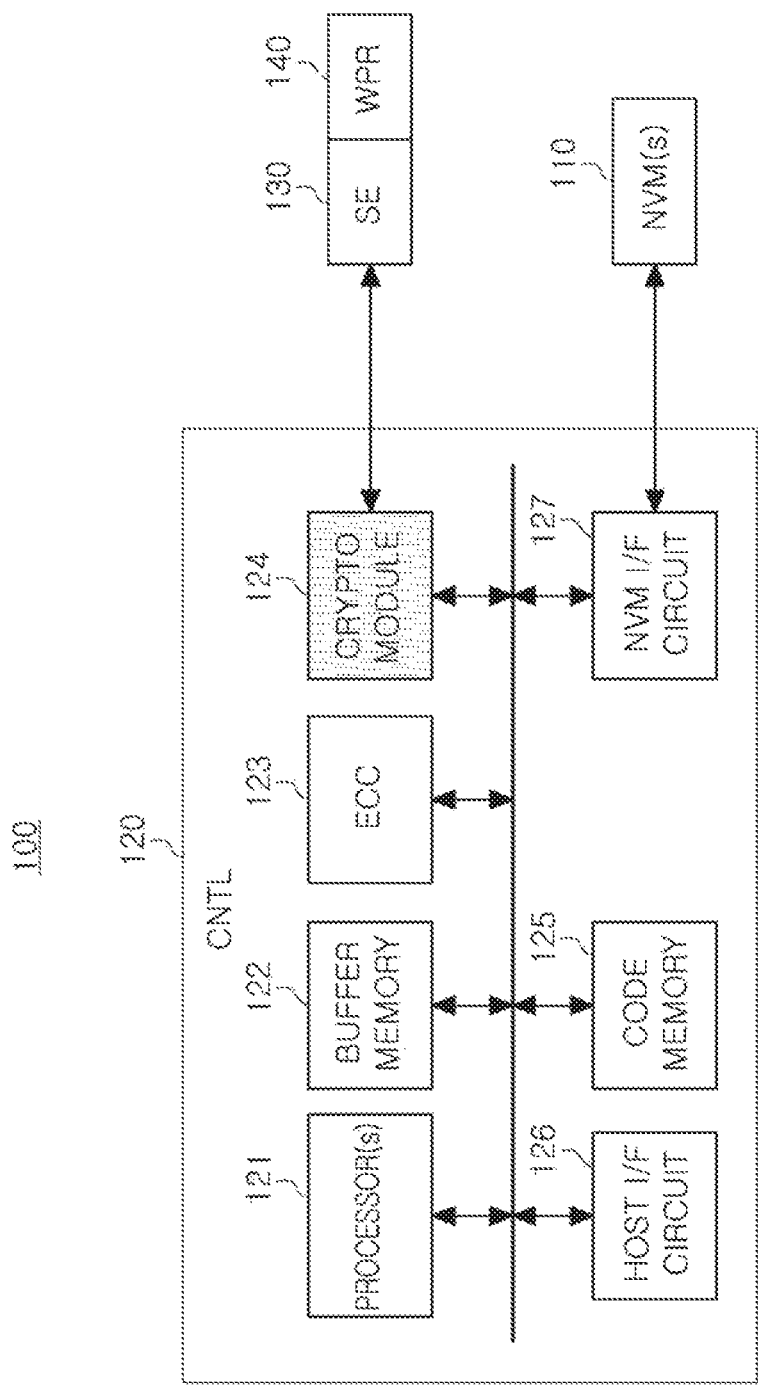
FIG. 6 is a view illustrating an example of a memory controller of the storage device illustrated in FIG. 1.

FIG. 6 is a view illustrating the memory controller CNTL 120 of the storage device 100 illustrated in FIG. 1. Referring to FIG. 6, the memory controller 120 may include at least one processor 121, a buffer memory 122, an error correcting circuit ECC 123, a cryptographic module CRYPTO MODULE 124, a code memory 125, a host interface circuit (Host I/F Circuit) 126, and a non-volatile memory interface circuit (NVM I/F Circuit) 127.

The at least one processor 121 may be realized to control the overall operation of the storage device 100 (see FIG. 1). The processor 121 may include a central processing unit (CPU).

The buffer memory 122 may temporarily store data necessary for the operation of the memory controller 120. The buffer memory 122 illustrated in FIG. 6 is disposed in the memory controller 120, but it should be understood that exemplary embodiments are not limited thereto. In some exemplary embodiments, the buffer memory 122 may be disposed as a separate intellectual property (IP) block outside the memory controller 120.

The error correcting circuit ECC 123 may be realized to calculate an error correction code value of data (first data) to be written in the write operation, and/or error-correct data (second data) read in the read operation based on an error correction code value. The error correcting circuit 123 may be realized to correct an error of data recovered from the non-volatile memory device 110 in a data recovery operation. The error correcting circuit 123 may correct errors using coded modulation such as a low density parity check (LDPC) code, a BCH code, a turbo code, a Reed-Solomon code, a convolution code, a recursive systematic code (RSC), and a trellis-coded modulation (TCM), a block coded modulation (BCM), or the like.

The cryptographic module CRYPTO MODULE 124 may be realized to encrypt data (first data) using an encryption algorithm and/or decrypt encrypted data (second data) using the encryption algorithm. As described in FIG. 1, the cryptographic module 124 may perform the encryption algorithm using key information stored on the secure element 130.

The code memory 125 may be realized to store code data necessary to operate the memory controller 120. Here, the code memory may be implemented as a non-volatile memory device.

The host interface circuit (Host I/F Circuit) 126 may be realized to provide an interface function with an external device. The host interface circuit 126 may be realized as a non-volatile memory express (NVMe), peripheral component interconnect express (PCIe), serial at attachment (SATA), small computer system interface (SCSI), serial attached SCSI (SAS), universal storage bus (USB) attached SCSI (UAS), Internet small computer system interface (iSCSI), fiber channel, Fiber channel over ethernet (FCoE), or the like.

The non-volatile memory interface circuit (NVM I/F Circuit) 127 may be realized to provide an interface function with the non-volatile memory device 110 (or the non-volatile memory device 110*a*). The secure element SE 130 and the wireless power receiver WPR 140 shown in FIG. 6 may be realized as an extraction type.

The secure element 130 illustrated in FIG. 6 is disposed outside the memory controller CTRL 120. However, exemplary embodiments are not limited thereto. In some exemplary embodiments, the secure element 130 may be embedded in the memory controller CTRL 120.

Figure 7:
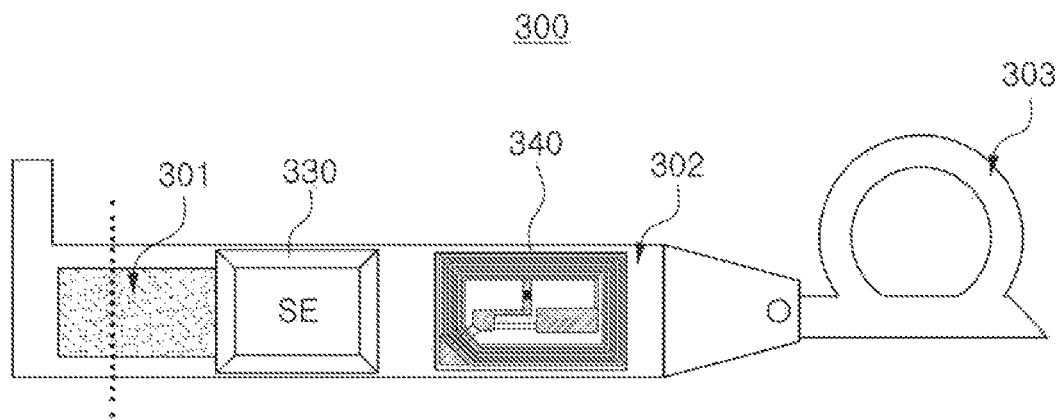
FIG. 7 is a view illustrating an extraction type secure element for proof of destruction according to an exemplary embodiment.

FIG. 7 is a view illustrating an extraction-type security module for proving destruction of a storage device according to exemplary embodiment. Referring to FIG. 7, an extraction-type security module 300 may include a secure element 330 connected to the memory controller 120 (see FIG. 1) by a first flexible printed circuit board (FPCB) 301, a wireless power receiver 340 provided in a second FPCB 302, and a ring 303 attached to the second FPCB 302. In some exemplary embodiments, the secure element 330 may be a security chip. In some exemplary embodiments, the ring 303 may be omitted. The wireless power receiver 340 may include at least one antenna that receives power wirelessly. The secure element 330 and the wireless power receiver 340 may correspond to the secure element SE 130 and the wireless power receiver 140, respectively.

In an exemplary embodiment, physical damage may occur to the secure element 330 when the user physically extracts the extraction-type security module 300 from the storage device 100. Here, such physical damage is detected by an internal detector of the secure element 330, and the secure element 330 may permanently delete important data (personal information, key information, etc.) according to a detection result.

FIGS. 8A, 8B, 8C, and 8D are views illustrating a start of a data destruction operation due to physical damage to the secure element 330.

Figure 8A:
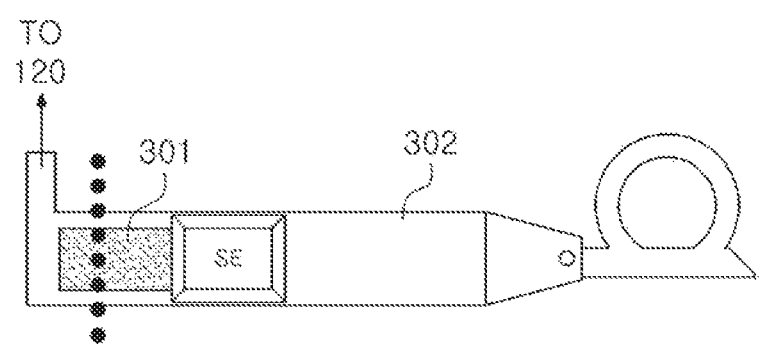
FIGS. 8A, 8B, 8C, and 8D are views illustrating start of a data destruction operation due to physical damage to a secure element.
Figure 8B:
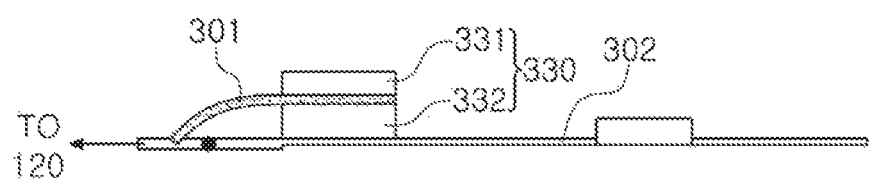

FIGS. 8A and 8B are views illustrating the extraction-type security module 300 connected to the memory controller 120 (see FIG. 1). Referring to FIGS. 8A and 8B, a top plate 331 and a bottom plate 332 of a package of the secure element 330 may be connected to different devices using an FPCB. For example, the top plate 331 may be connected to the first FPCB 301, and the bottom plate 332 may be connected to the second FPCB 302. In some exemplary embodiments, the top plate 331 may be connected to the first FPCB 301, and the bottom plate 332 may be connected to the first FPCB 301 and the second FPCB 302.

Figure 8C:
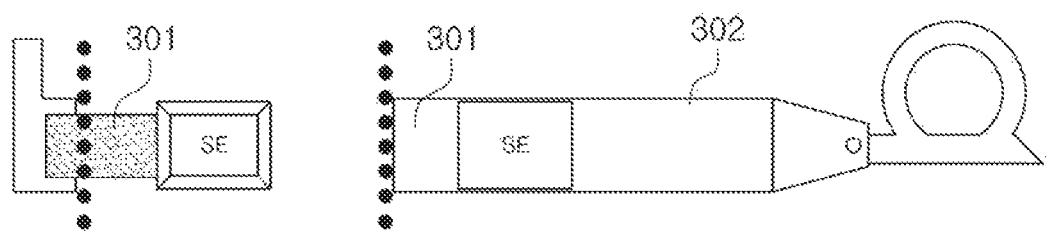
Figure 8D:
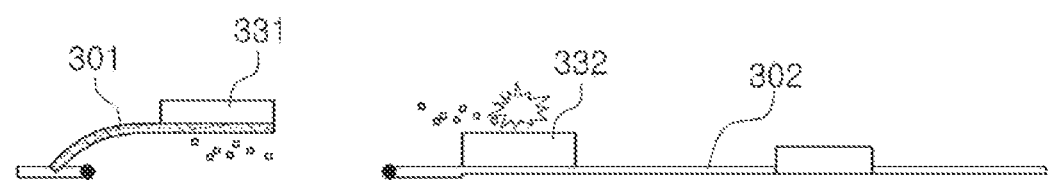

As illustrated in FIGS. 8C and 8D, when the user physically pulls the ring from the outside, the top plate 331 and the bottom plate 332 of the secure element 330 may be separated. When an active shield structure connected to the top plate 331 (or connected to the bottom plate 332) is damaged, the secure element 330 may generate an alarm signal (data destruction signal) internally. It should be understood that exemplary embodiments are not limited thereto. In some embodiments, the alarm signal may be generated by a different mechanism when a user physically pulls the ring from outside.

Figure 9A:
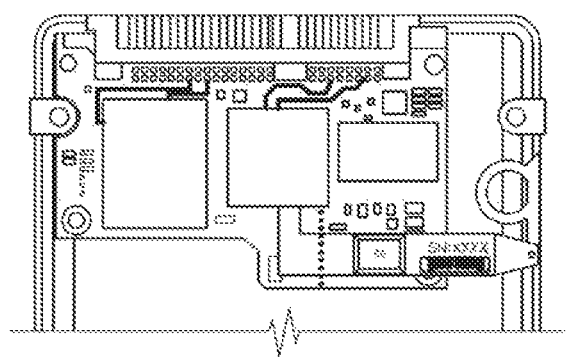
FIGS. 9A, 9B, 9C, and 9D are views illustrating a process of separating an extraction type secure element module from a storage device.
Figure 9B:
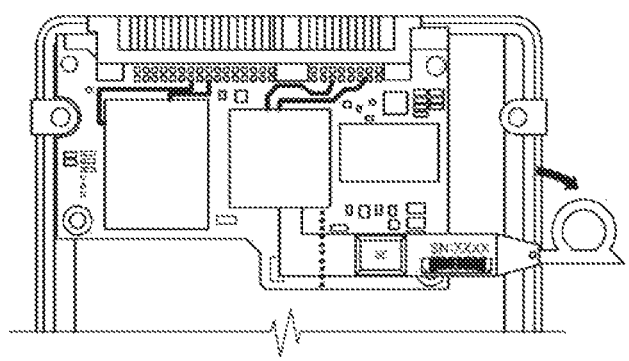
Figure 9C:
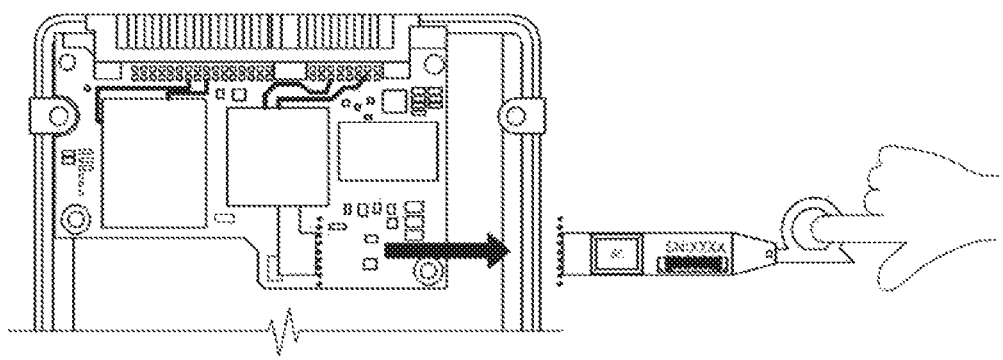
Figure 9D:
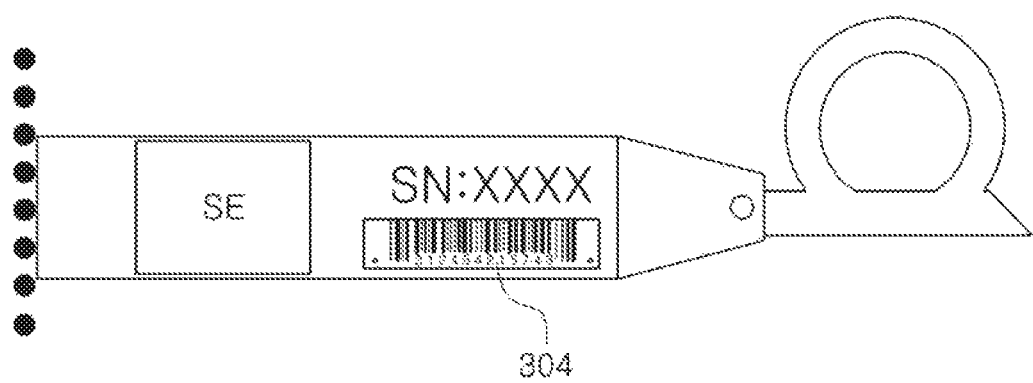

FIGS. 9A, 9B, 9C, and 9D are views schematically illustrating a process of separating an extraction-type security module from a storage device. As shown in FIG. 9A, a ring portion of the extraction-type security module may exist in a folded state for storage within a storage device. As shown in FIG. 9B, when proof of destruction is required, the folded ring portion may be unfolded. As shown in FIG. 9C, the user may pull the ring portion in the unfolded state using a finger. In response to pulling the ring, the top plate 331 and the bottom plate 332 of the secure element 330 may be physically separated as illustrated in FIGS. 8C and 8D. As shown in FIG. 9D, the extraction-type security module may include unique identification information 304. For example, the identification information may be pair identification information such as a barcode/QR code/RFID (Radio Frequency Identification) that identifies a correspondence between a motherboard of the storage device and the extraction-type security module. Thereafter, the identification information 304 may be used for proof of destruction in destroying the storage device.

Hereinafter, the data destruction operation of a secure element will be described.

Figure 10A:
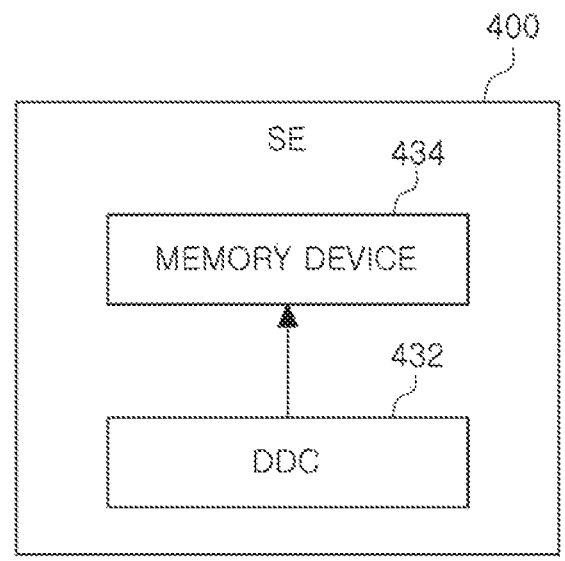
FIGS. 10A and 10B are views illustrating examples of a secure element according to various exemplary embodiments.
Figure 10B:
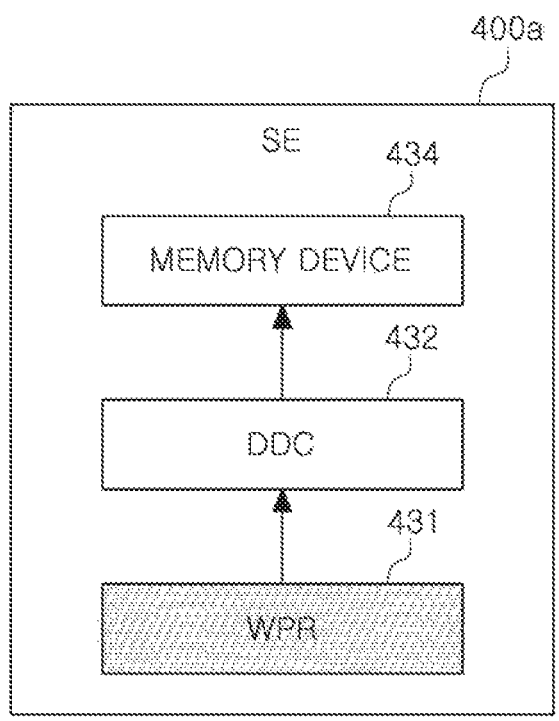

FIGS. 10A and 10B are views illustrating examples of a secure element according to various exemplary embodiments.

Referring to FIG. 10A, a secure element 400 may include a data destruction circuit (DDC) 432 and a memory device 434. The data destruction circuit 432 may perform a data destruction operation to destroy data of the memory device 434 in response to a data destruction signal. Here, the memory device 434 may store sensitive personal information or key information.

In an exemplary embodiment, the data destruction operation may be performed upon receiving power provided from the wireless power receiver (WPR) (see FIG. 1).

The secure element according to some exemplary embodiments may include a wireless power receiver (WPR). Referring to FIG. 10B, a secure element 400*a* may further include a wireless power receiver (WPR) 431 as compared to that shown in FIG. 10A. According to various exemplary embodiments, the secure element 400, 400*a* may correspond to the secure element SE 130 or the secure element 330 described above, and the wireless power receiver WPR 431 may correspond to the wireless power receiver WPR 140 or the wireless power receiver WPR 340 described above.

Figure 11:
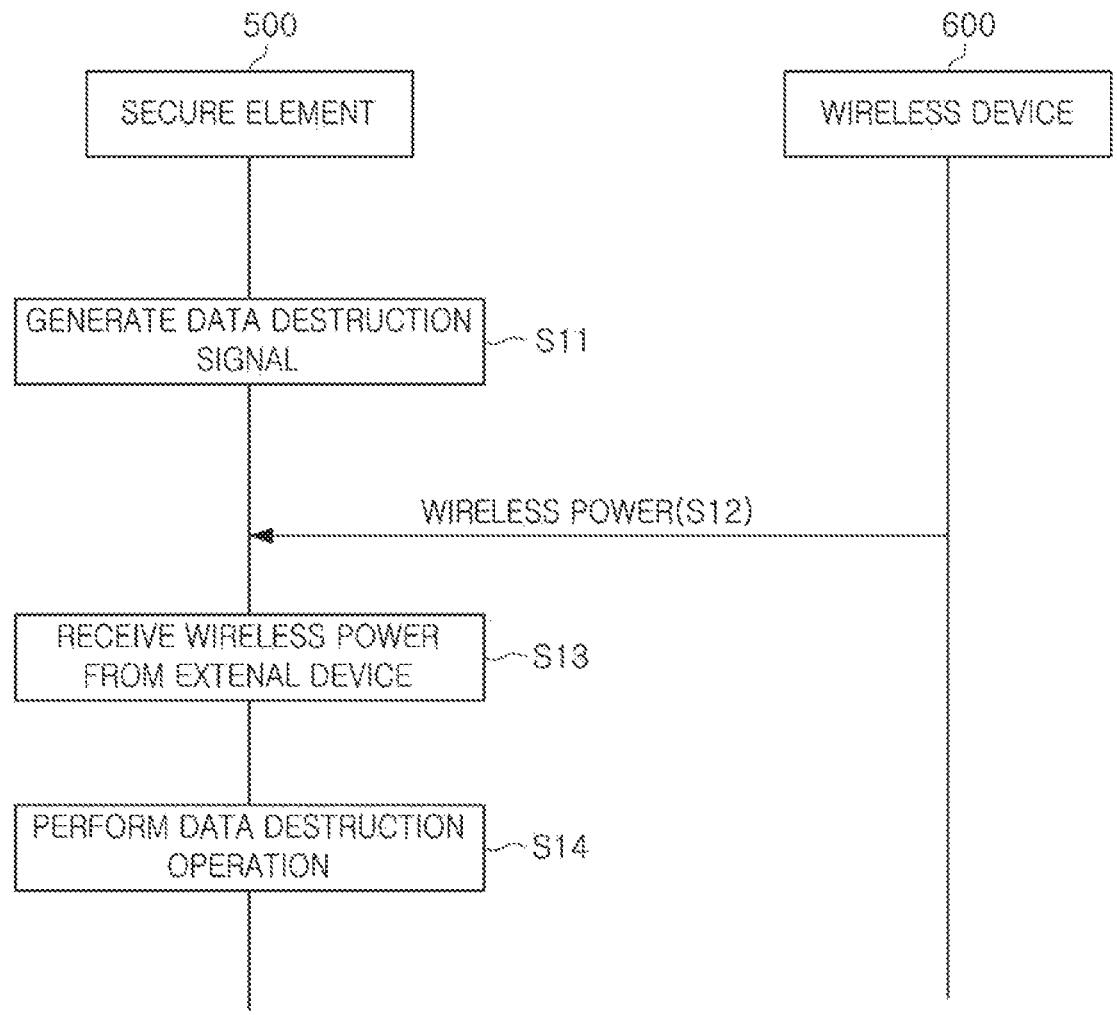
FIG. 11 is a ladder diagram illustrating a data destruction operation of a secure element according to an exemplary embodiment.

FIG. 11 is a ladder diagram illustrating a data destruction operation of a secure element according to exemplary embodiment. Referring to FIG. 11, a secure element 500 may perform a data destruction operation as follows. The secure element 500 may correspond to the secure element SE 130, the secure element 330, or the secure element 400 or 400a.

The secure element 500 may generate a data destruction signal (S11). For example, secure element 500 may generate the data destruction signal according to an internal policy. Here, the internal policy may include detecting a destruction operation of the secure element 500. (see FIGS. 8A-8D). Thereafter, a wireless device 600 may provide wireless power to the secure element 500 (S12). For example, the wireless device 600 may provide the wireless power to the secure element 500 using wireless communication. The wireless device 600 may correspond to the wireless device 200 described above. The secure element 500 may receive wireless power from the wireless device 600 (S13). For example, the secure element 500 may receive the wireless power from the wireless device 600 using wireless communication. In some exemplary embodiments, the secure element 500 may separately include a charging capacitor for storing power. The secure element 500 may perform the data destruction operation (S14). For example, the secure element 500 may perform the data destruction operation for the memory device in the secure element using the wireless power.

The data destruction signal in the example illustrated in FIG. 11 is generated in the secure element 500. However, exemplary embodiments are not limited thereto. In some exemplary embodiments, the secure element 500 may receive the data destruction signal from the outside the secure element 500.

Figure 12:
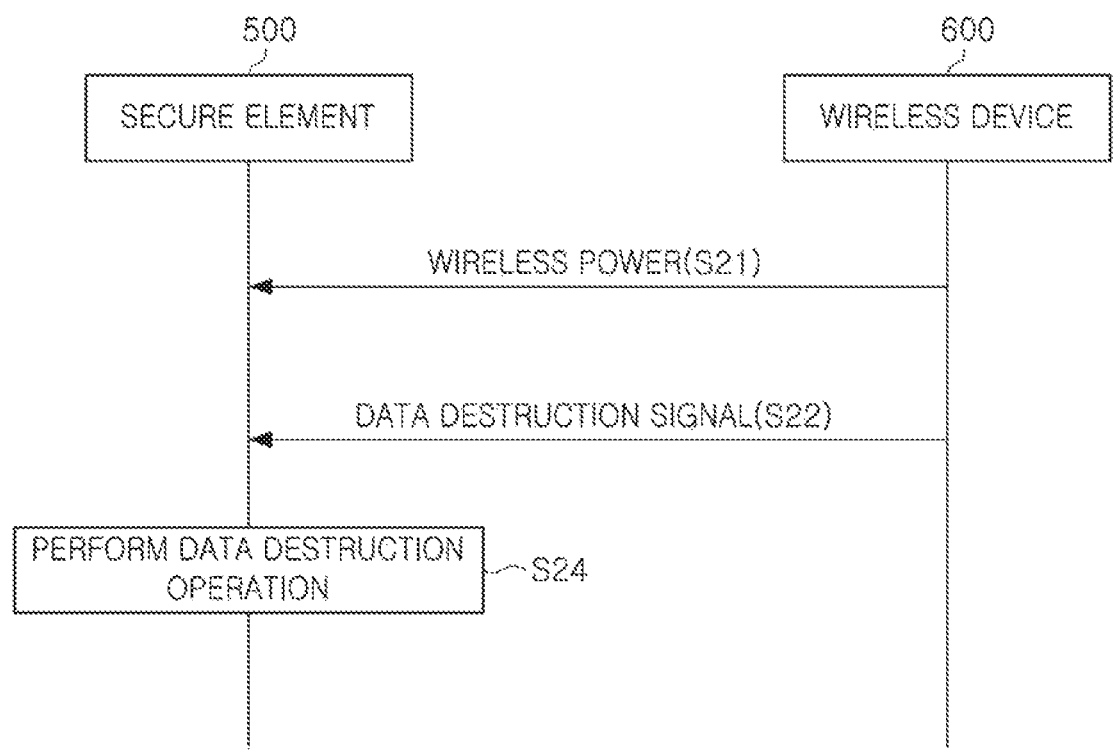
FIG. 12 is a ladder diagram illustrating a data destruction operation of a secure element according to another exemplary embodiment.

FIG. 12 is a ladder diagram illustrating a data destruction operation of a secure element according to another exemplary embodiment. Referring to FIG. 12, the secure element 500 may perform a data destruction operation as follows. The wireless device 600 may provide wireless power to the secure element 500 (S21). For example, the wireless device 600 may provide the wireless power to the secure element 500 using wireless communication. The wireless device 600 may transmit a data destruction signal to the secure element 500 (S22). FIG. 12 illustrates that the data destruction signal S22 is transmitted after the wireless power S21. However, this is only an example, and in some exemplary embodiments, the wireless device 600 may transmit the data destruction signal to the secure element 500 at the same time the wireless power is provided to the secure element 500. The secure element 500 may perform a data destruction operation (S24). For example, the secure element 500 may perform the data destruction operation on the internal memory device using the wireless power.

In some exemplary embodiments, after completing the data destruction operation, the secure element 500 may generate a completion signal and transmit the generated completion signal to the wireless device 600.

Figure 13:
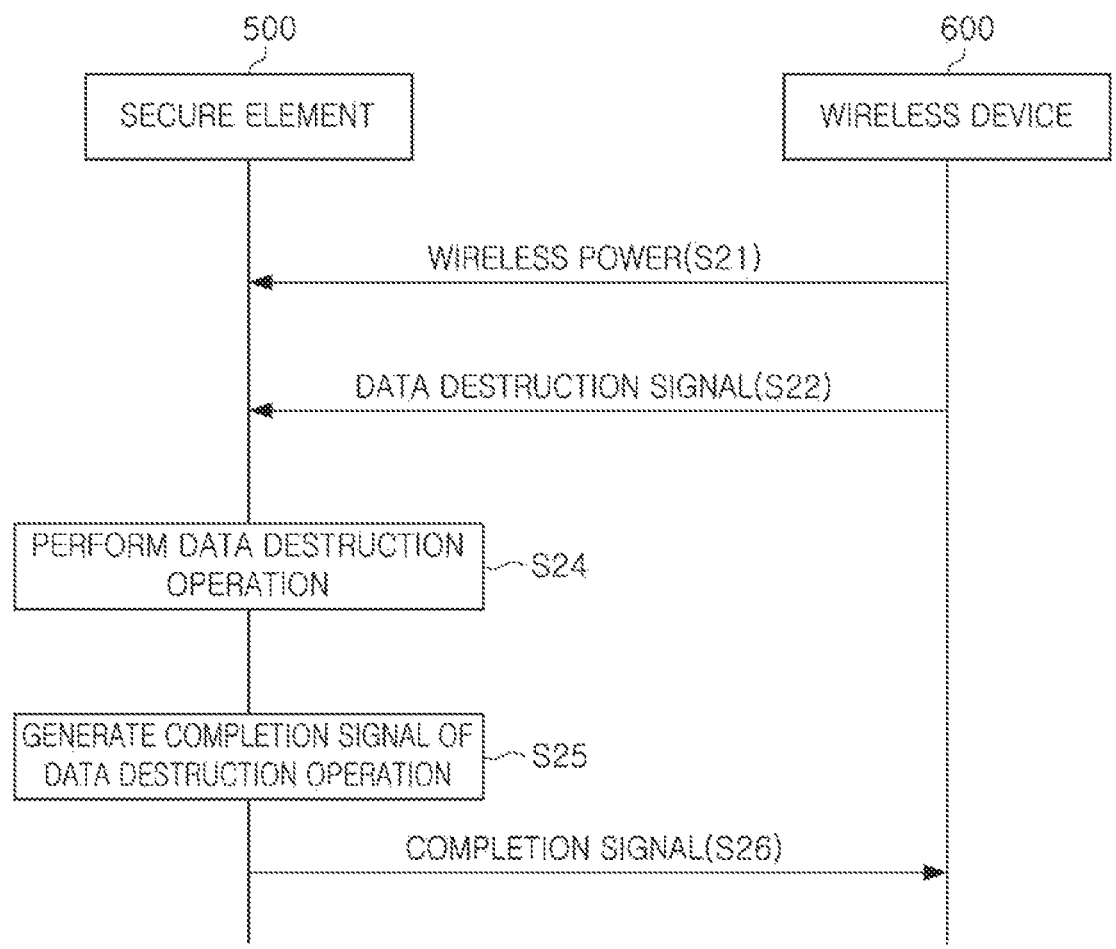
FIG. 13 is a ladder diagram illustrating a data destruction operation of a secure element according to another exemplary embodiment.

FIG. 13 is a ladder diagram illustrating a data destruction operation of a secure element according to another exemplary embodiment. Referring to FIG. 13, operations S21, S22, and S24 are the same as in the example illustrated in FIG. 12, and thus repeated description thereof is omitted for conciseness. The data destruction operation may further include generating a completion signal of the data destruction operation (S25) and transmitting the generated completion signal to the wireless device 600 (S26) compared to the data destruction operation shown in FIG. 12.

In some exemplary embodiments, before the data destruction operation of the secure element 500 is performed, an authentication process may be further included between the secure element 500 and the wireless device 600.

Figure 14:
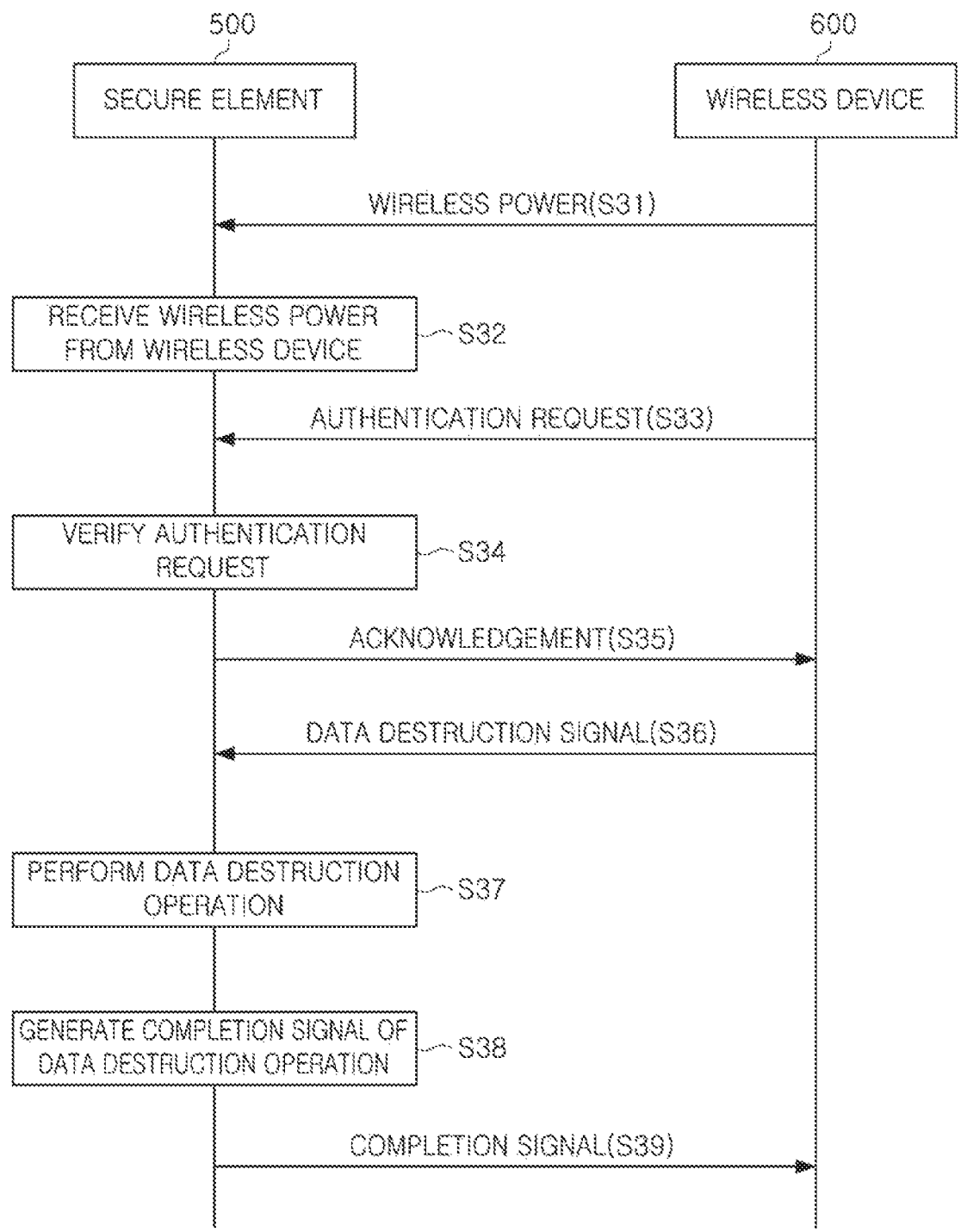
FIG. 14 is a ladder diagram illustrating a data destruction operation of a secure element according to another exemplary embodiment.

FIG. 14 is a ladder diagram illustrating a data destruction operation of a secure element according to another exemplary embodiment. Referring to FIG. 14, the data destruction operation of the secure element 500 may be performed as follows.

The wireless device 600 may transmit wireless power to the secure element 600 (S31). The secure element 500 may receive the wireless power from the wireless device 600 (S32). The wireless device 600 may transmit an authentication request to the secure element 500 (S33). The secure element 500 may verify authentication of the wireless device 600 in response to the authentication request (S34). If the wireless device 600 transmits the authorized authentication request, the secure element 500 may transmit an acknowledgement to the wireless device 600 (S35). The acknowledgement may include a result of the authentication. Thereafter, the wireless device 600 may transmit a data destruction signal to the secure element 500 (S36). The secure element 500 may perform a data destruction operation (S37). For example, the secure element 500 may perform the data destruction operation using the received power. The secure element 500 may generate a completion signal after the data destruction operation is completed (S38), and transmit the generated completion signal to the wireless device 600 (S39).

In some exemplary embodiments, the secure element 500 according to an exemplary embodiment receives power from the external wireless device 600 during the data destruction operation. However, exemplary embodiments are not limited thereto. The secure element 500 according to some exemplary embodiment may perform the data destruction operation even in a state of being connected to the memory controller 120 (see, e.g., FIG. 1 and FIG. 11).

Figure 15:
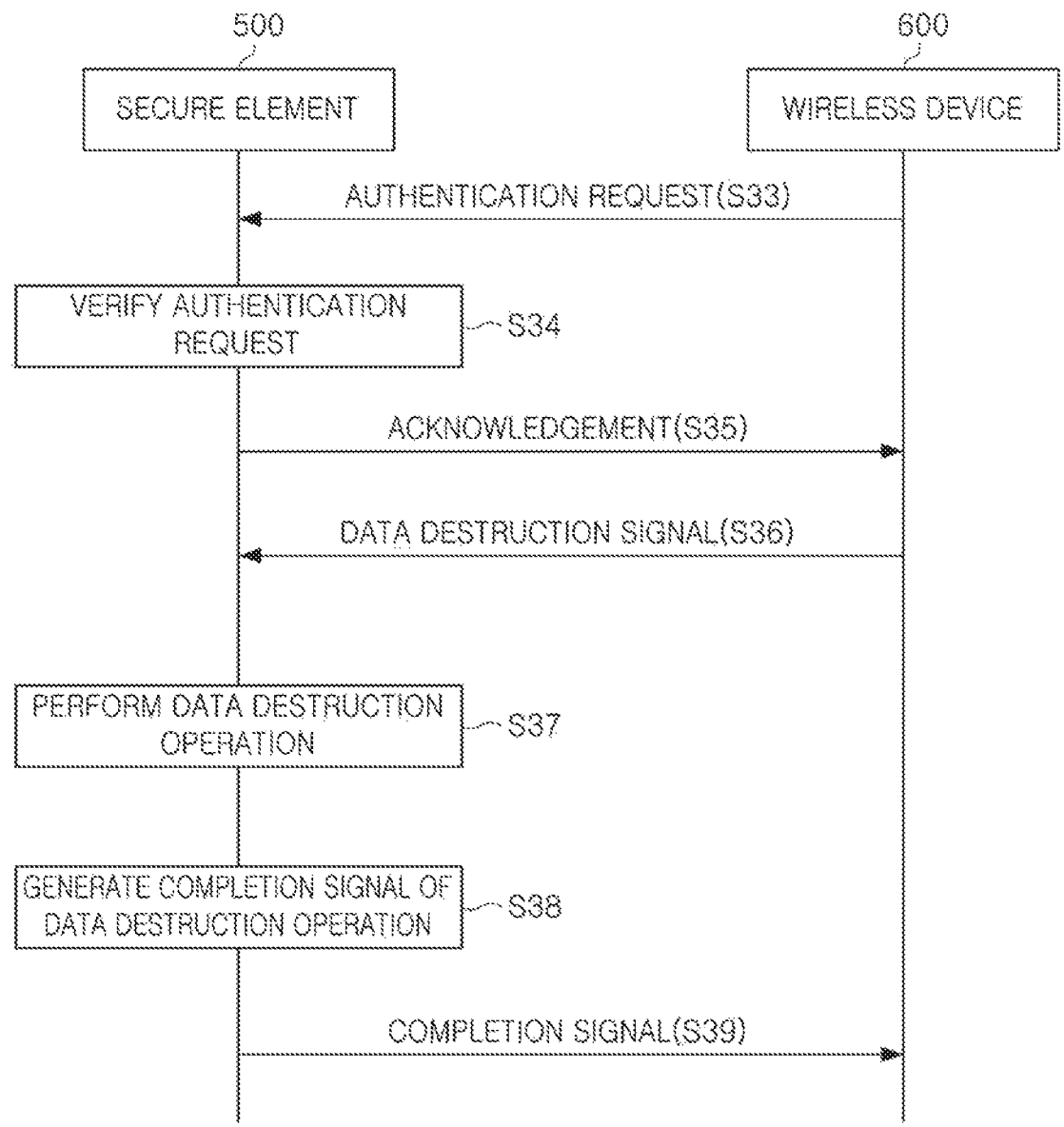
FIG. 15 is a ladder diagram illustrating a data destruction operation of a secure element according to another exemplary embodiment.

FIG. 15 is a ladder diagram illustrating a data destruction operation of a secure element according to another exemplary embodiment. Referring to FIG. 15, the data destruction operation of the secure element is the same as in FIG. 14, except that the data destruction operation of the secure element 500 in FIG. 15 omits transmitting wireless power from the wireless device 600 to the secure element 500 (S31) and receiving, by the secure element 500, wireless power from the wireless device 600 (S32) in the data destruction operation of FIG. 14.

In some exemplary embodiments, the data destruction operation may be performed differently depending on types (e.g., an overwritable memory device and a non-overwritable memory device) of the memory device as a target of deletion in the secure element. In other words, the secure element may include a memory device for storing secure data, and the data destruction operation may be performed differently depending on the type of the memory device. Hereinafter, the data destruction operation performed differently according to targets of deletion will be described.

Figure 16:
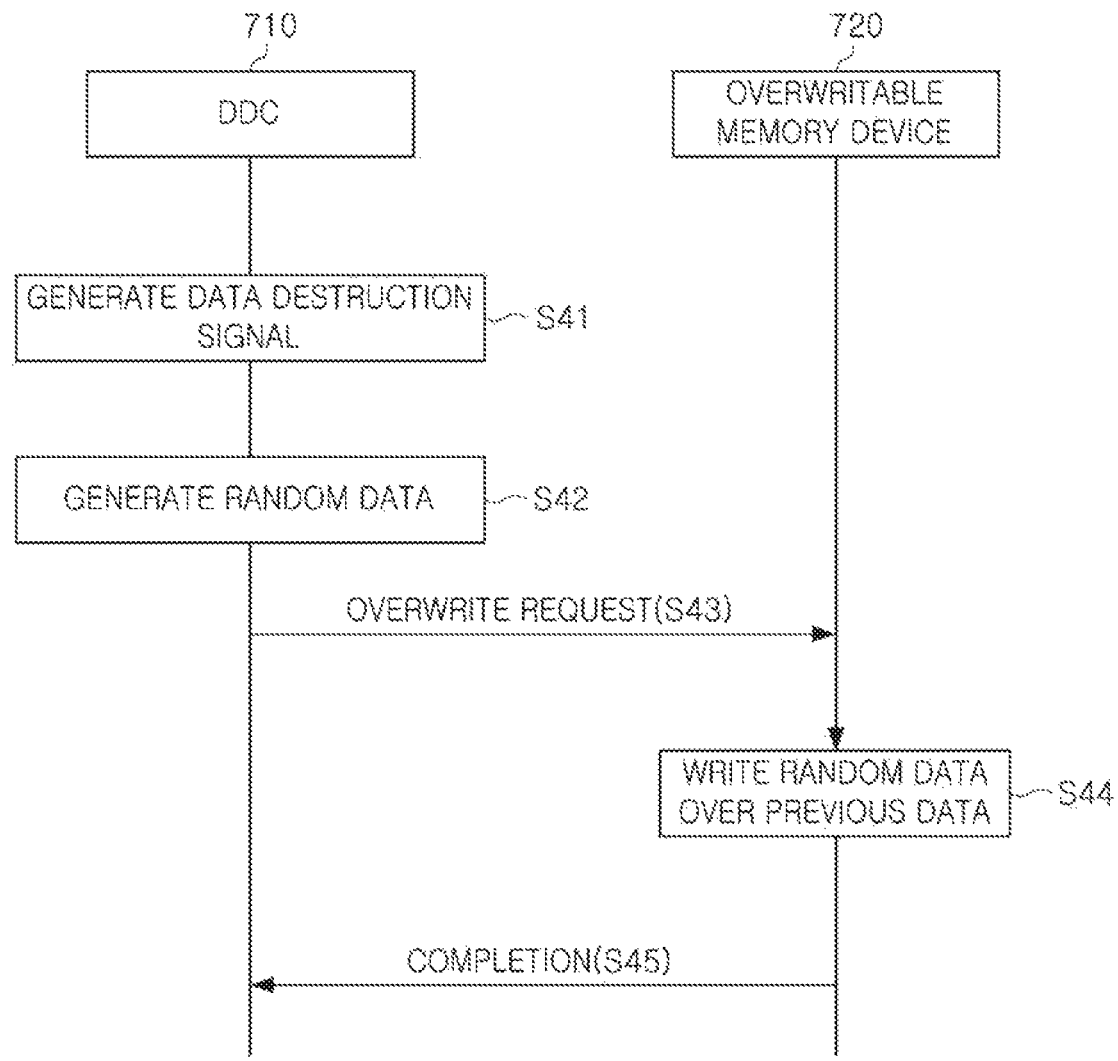
FIG. 16 is a ladder diagram illustrating a data destruction operation in an overwritable memory of a secure element according to an exemplary embodiment.

FIG. 16 is a ladder diagram illustrating a data destruction operation in an overwritable memory of the secure element according to an exemplary embodiment. Referring to FIG. 16, the data destruction operation of a data destruction circuit DDC 710 for an overwritable memory device 720 in the secure element may be performed as follows.

The data destruction circuit DDC 710 may generate a data destruction signal (S41). For example, the data destruction circuit DDC 710 may internally generate the data destruction signal. The data destruction circuit 710 may generate random data in response to the data destruction signal (S42). The data destruction circuit 710 may transmit an overwrite request to the overwritable memory device 720 (S43). For example, the data destruction circuit 710 may transmit the overwrite request using the generated random data. The overwritable memory device 720 may write the random data over previous data in response to the overwrite request (S44). In some exemplary embodiments, the random data may be generated by a random number generator. In some exemplary embodiments, the random number generator may be realized by a physical unclonable function (PUF) circuit. After overwriting is completed, the overwritable memory device 720 may transmit a completion signal to the data destruction circuit 710 (S45).

Overwriting in the data destruction operation is not be limited to the use of random data. In some exemplary embodiments, previously determined security data in the overwritable memory device may be read, subsequently modified by modulating (encrypting) the read data, and overwriting the previously determined security data with the modified data.

Figure 17:
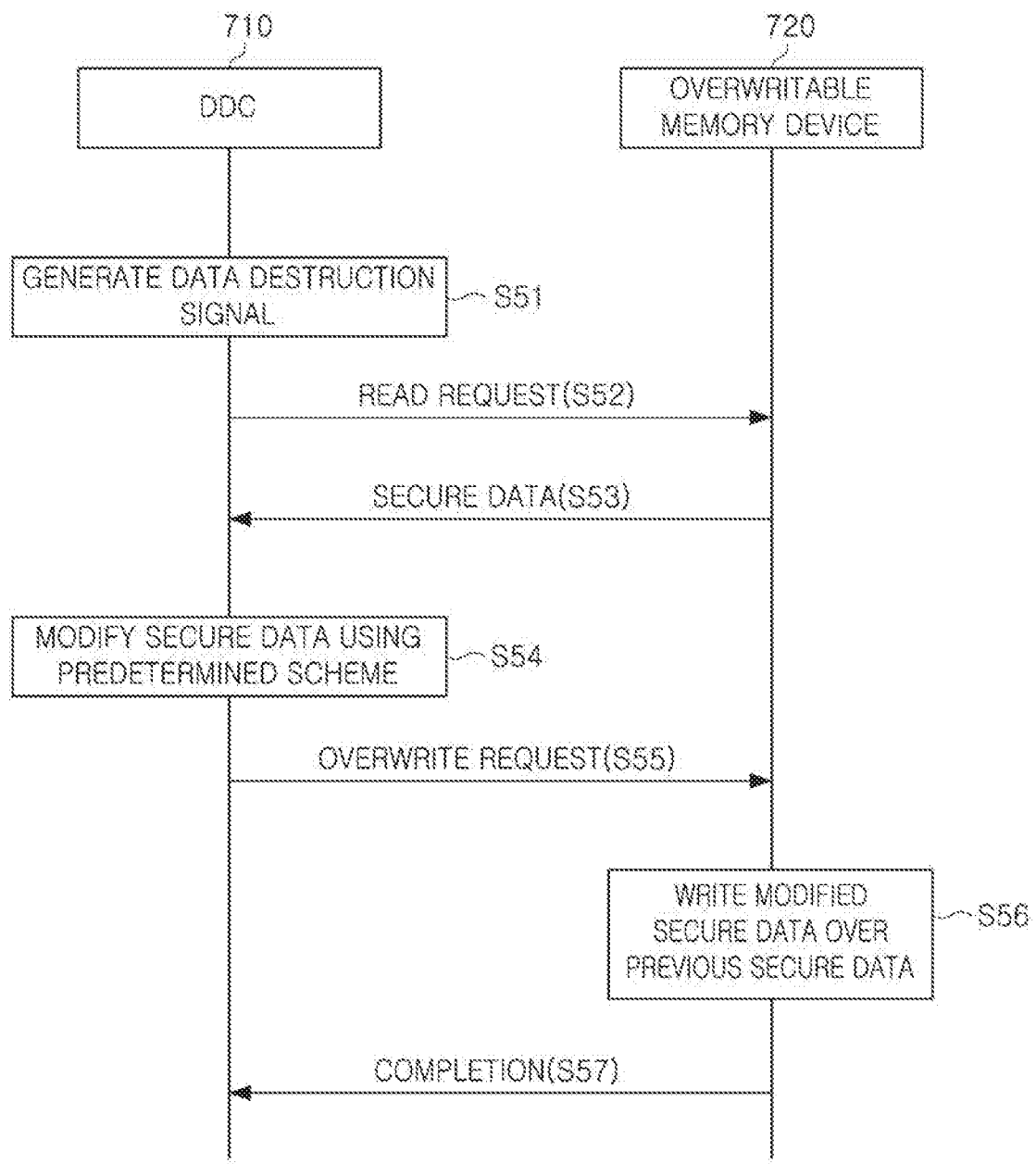
FIG. 17 is a ladder diagram illustrating a data destruction operation in an overwritable memory device of a secure element according to another exemplary embodiment.

FIG. 17 is a ladder diagram illustrating a data destruction operation in an overwritable memory device of a secure element according to another exemplary embodiment. Referring to FIG. 17, a data destruction operation of the data destruction circuit DDC 710 for the overwritable memory device 720 in the secure element may be performed as follows.

The data destruction circuit DDC 710 may generate a data destruction signal (S51). For example, the data destruction circuit DDC 710 may generate the data destruction signal internally. The data destruction circuit 710 may transmit a read request to the overwritable memory device 720 (S52). For example, the data destruction circuit 710 may transmit a read request for secure data to be deleted. In some exemplary embodiments, the read request may be a read request for all data stored on the overwritable memory device 720. In other exemplary embodiments, the read request may be a read request for some data stored on the overwritable memory device 720. The overwritable memory device 720 may transmit the secure data to the data destruction circuit 710 in response to the read request (S53). The data destruction circuit 710 may modify the security data using a predetermined method (S54). Here, the predetermined method may be a modulation technique or an encryption technique, or the like.

The data destruction circuit 710 may transmit an overwrite request to the overwritable memory device 720 (S55). For example, the data destruction circuit 710 may transmit the overwrite request using the modulated data. The overwritable memory device 720 may write the modified secure data over the previous secure data in response to the overwrite request (S56). After overwriting is completed, the overwritable memory device 720 may transmit a completion signal to the data destruction circuit 710 (S57).

Figure 18:
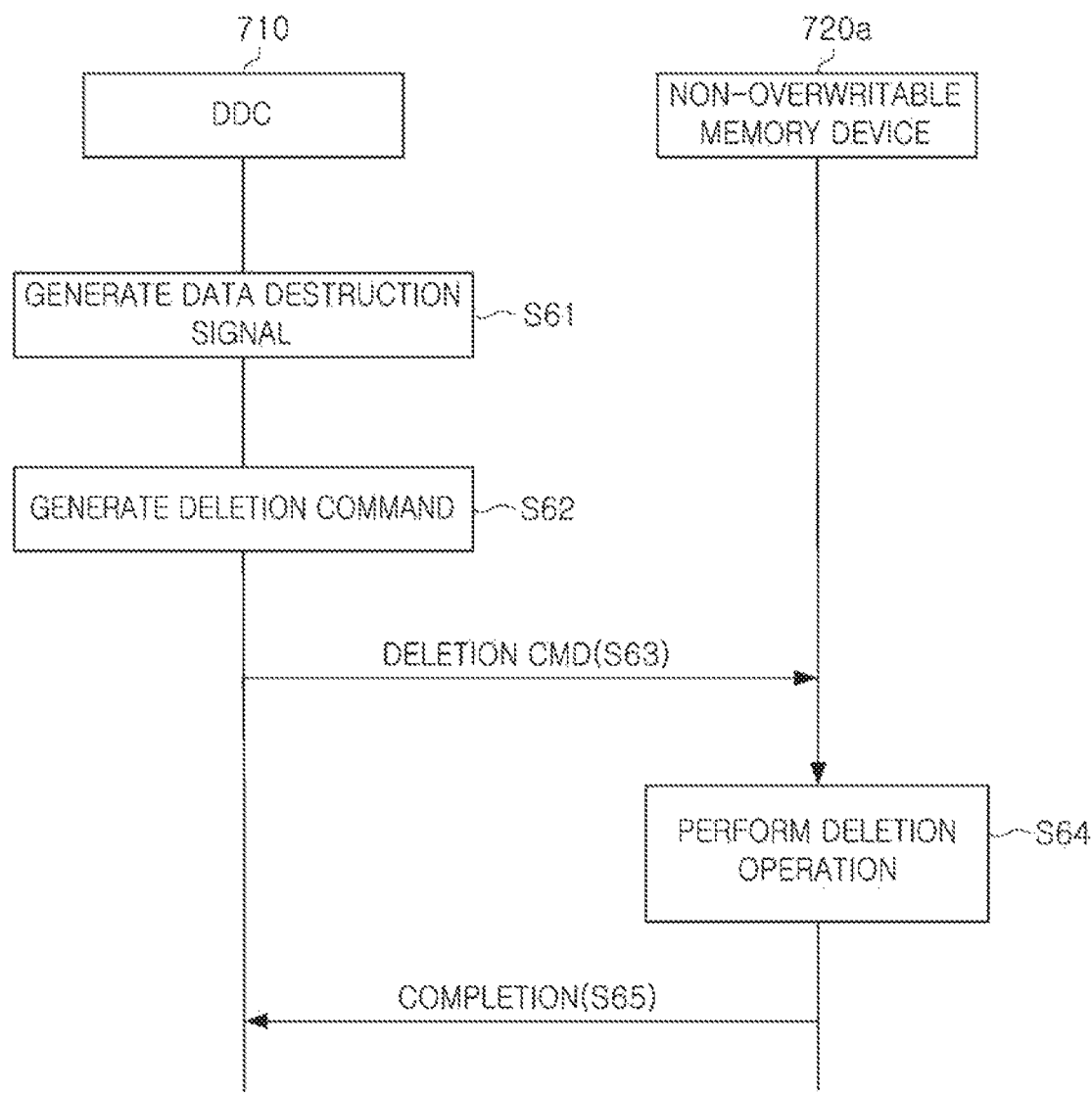
FIG. 18 is a ladder diagram illustrating a data destruction operation in a non-overwritable memory device of a secure element according to an exemplary embodiment.

FIG. 18 is a ladder diagram illustrating a data destruction operation in a non-overwritable memory device of a secure element according to an exemplary embodiment. Referring to FIG. 18, the data destruction operation for a non-overwritable memory device 720*a* in a secure element may be performed as follows.

The data destruction circuit DDC 710 may generate a data destruction signal (S61). For example, the data destruction circuit DDC 710 may generate the data destruction signal internally. The data destruction circuit 710 may generate a deletion command in response to the data destruction signal (S62). The data destruction circuit 710 may transmit the deletion command (CMD) to the non-overwritable memory device 720*a* (S63). The memory device 720*a* may perform a delete operation in response to the deletion command (S64). In some exemplary embodiments, the deletion command may be a sanitization command in the case of a NAND flash memory. After the deletion operation is completed, the non-overwritable memory device 720*a* may transmit a completion signal to the data destruction circuit 710 (S65).

Figure 19A:
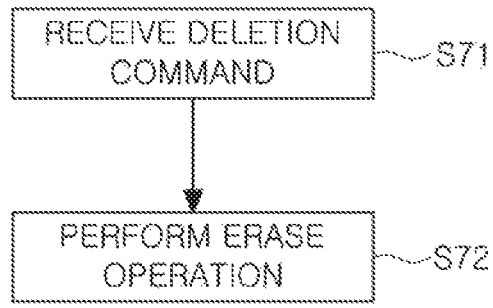
FIGS. 19A, 19B, and 19C are flowcharts illustrating data deleting techniques in a non-overwritable memory device, according to various exemplary embodiments.
Figure 19B:
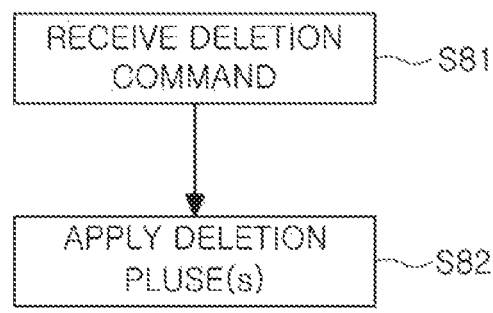
Figure 19C:
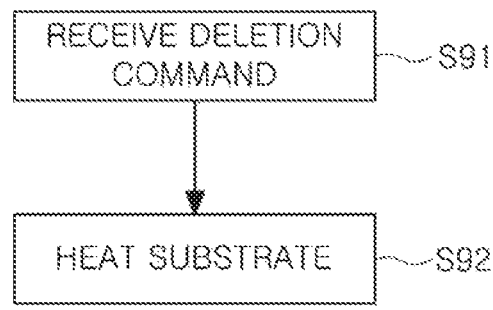

FIGS. 19A, 19B, and 19C are flowcharts illustrating various data deleting techniques in a non-overwritable memory, according to various exemplary embodiments.

Referring to FIG. 19A, a non-overwritable memory device 720*a*, for example, a NAND flash memory, may receive a deletion command from the data destruction circuit 710 (S71). The non-overwritable memory device 730 may perform an erase operation on predetermined blocks (all or part) in response to the received deletion command (S72).

Referring to FIG. 19B, the non-overwritable memory 720*a* may receive a deletion command from the data destruction circuit 710 (S81). In response to the erase command, the non-overwritable memory device 720*a* may apply an erase pulse to a substrate of the all memory blocks or some memory blocks corresponding thereto (S82).

Referring to FIG. 19C, the non-overwritable memory 720*a* may receive a deletion command from the data destruction circuit 710 (S91). The non-overwritable memory device 720*a* may heat the substrate corresponding to all or some of the memory block in response to the deletion command (S92).

In some exemplary embodiments, the wireless device may simultaneously perform data destruction operations on a plurality of storage devices through a wireless communication method.

Figure 20:
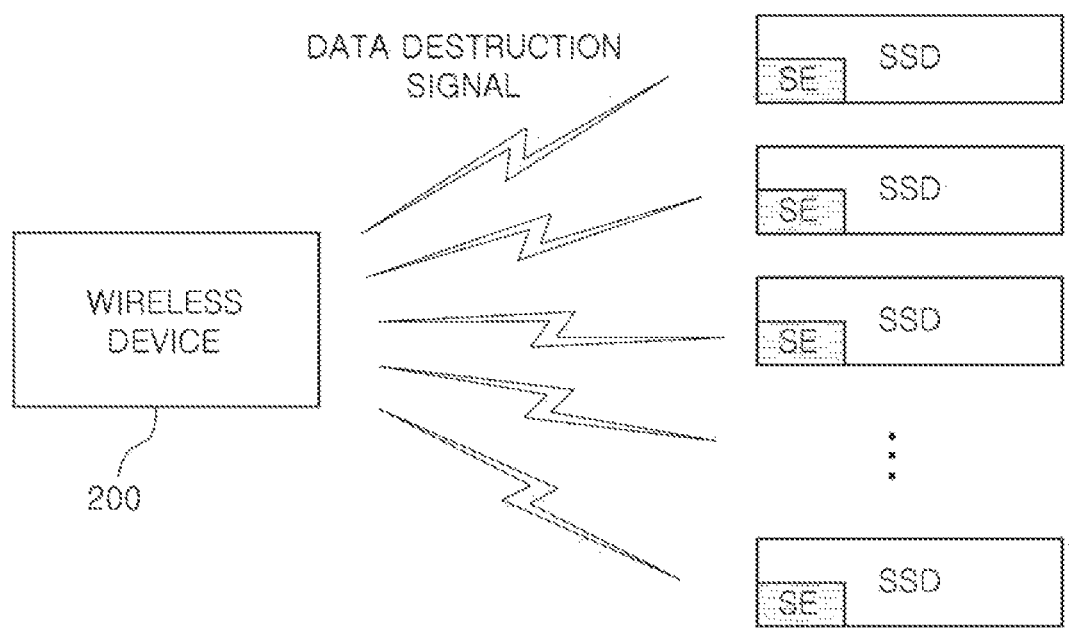
FIG. 20 is a view illustrating a data destruction operation for a plurality of storage devices according to an exemplary embodiment.

FIG. 20 is a diagram illustrating a data destruction operation for a plurality of storage devices according to an exemplary embodiment. Referring to FIG. 20, the wireless device 200 (refer to FIG. 1) may transmit a data destruction signal to a plurality of storage devices (SSDs) in a broadcast manner. Each of the plurality of storage devices may include a secure element SE described above with reference to FIGS. 1 to 19. The secure element SE may receive the data destruction signal from the wireless device and initiate a data deletion operation or a data destruction operation. In addition, after performing the data deletion operation or the data destruction operation, the secure element SE may transmit a completion signal to the wireless device. In some exemplary embodiments, the completion signal may include an identification number corresponding to the storage device (SSD) for which the data deletion operation or the data destruction operation was successfully completed. In some exemplary embodiments, the wireless device 200 may recognize the identification number corresponding to the secure element SE. Accordingly, the wireless device 200 may prove destruction of the storage device.

In some exemplary embodiments, the wireless device 200 may be a mobile device. For example, the wireless device 200 may perform a data destruction operation on the storage device (SSD) by a data destruction application installed in the mobile device.

The data destruction request method is not be limited to the broadcast method. In some exemplary embodiments, the data destruction request method may be transmitted in a unicast manner or a multicast manner.

In some exemplary embodiments, in the data destruction operation of the storage device, internal data of the non-volatile memory device may be primarily deleted, and thereafter, internal data of the secure element may be secondarily deleted.

Figure 21A:
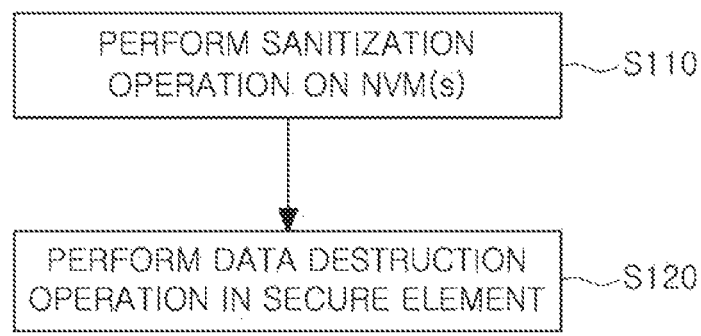
FIG. 21A is a flowchart illustrating a data destruction operation of a storage device according to an exemplary embodiment.

FIG. 21A is a flowchart illustrating a data destruction operation of a storage device according to an exemplary embodiment. Referring to FIG. 21A, a data destruction operation of the storage device 100 (see FIG. 1) may be performed as follows. The storage device 100 may perform a sanitization operation on the non-volatile memory NVM(s) 110 (S110). In an exemplary embodiment, when performing the sanitization operation, the storage device 100 may receive wireless power from a host device. Thereafter, the storage device 100 may be separated from the host device and perform a destruction process. The secure element 130 of the storage device 100 may perform a data destruction operation as described above with reference to FIGS. 1 to 20 (S120). In some exemplary embodiments, when performing the data destruction operation, the secure element 130 may receive wireless power from the external wireless device 200 (see FIG. 1). Accordingly, the storage device 100 may delete data stored on the non-volatile memory device 110 as well as sensitive information (personal information, key information, banking information, etc.) stored on the secure element 130.

In some exemplary embodiments, the data destruction operation of the storage device 100 may include receiving a sanitization command from the host device. In an exemplary embodiment, the secure element 130 may further include generating a data destruction signal according to an internal policy. In some exemplary embodiments, in the data destruction operation of the storage device 100, the secure element 130 may further receive a data destruction signal from an external wireless device. In some exemplary embodiments, when performing the data destruction operation, the storage device 100 may further receive wireless power from an external wireless device. In some exemplary embodiments, the data destruction operation may include performing overwriting on the memory of the secure element 130, applying an erase pulse to the memory of the secure element 130, or heating a board of the memory of the secure element 130. In some exemplary embodiments, in the data destruction operation, the wireless device 200 may further recognize an identification number associated between the secure element 130 and the storage device 100.

Figure 21B:
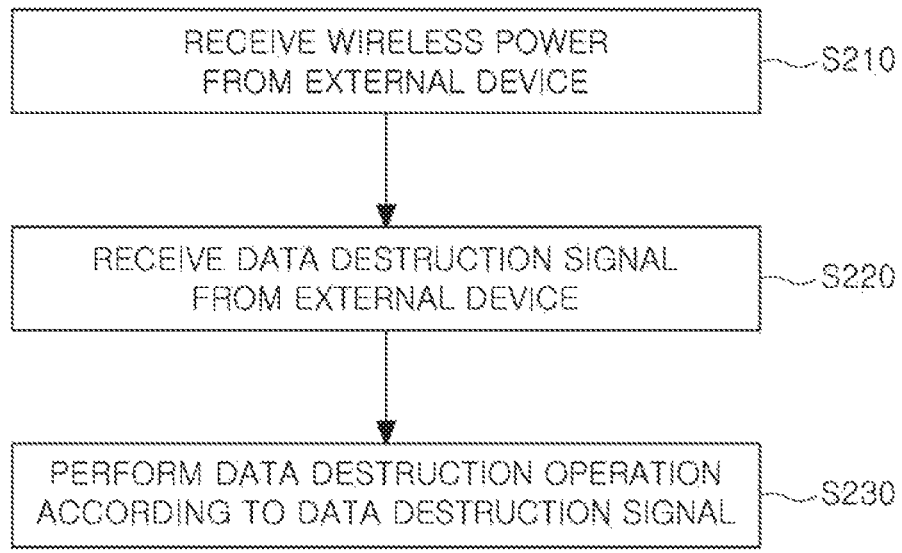
FIG. 21B is a flowchart illustrating a data destruction operation of a storage device according to another exemplary embodiment.

FIG. 21B is a flowchart illustrating a data destruction operation of a storage device according to another exemplary embodiment. Referring to FIG. 21B, a data destruction operation of the storage device 100 (see FIG. 1) may be performed as follows. The storage device 100 may receive wireless power from an external device (e.g., the wireless device 200) (S210). Further, the storage device 100 may receive a data destruction signal from the external device (S220). Thereafter, the storage device 100 may perform a data destruction operation according to the data destruction signal (S230).

In some exemplary embodiments, performing the data destruction operation S230 may include deleting key information necessary for security in an encryption/decryption operation. In some exemplary embodiments, the data destruction operation may include an operation of overwriting the memory storing key information. In some exemplary embodiments, the data destruction operation may include an erase operation on the memory storing key information. In some exemplary embodiments, transmitting a completion signal to the external device after the data destruction operation is completed may be further included.

In some exemplary embodiments, the data destruction operation may further include receiving an authentication request signal from the external device, performing an authentication operation on the external device in response to the authentication request signal, and starting the data destruction operation after the authentication operation is completed.

In some exemplary embodiments, the performing the data destruction operation may include deleting data of at least one non-volatile memory device. In some exemplary embodiments, deleting of the data may include deleting map data of the at least one non-volatile memory device. In some exemplary embodiments, deleting of the map data may include performing overwriting on the map data or performing an erase operation on the map data. In other exemplary embodiments, the deleting of the data may include deleting user data of the non-volatile memory device. In some exemplary embodiments, the deleting of the user data may include performing overwriting on the user data or performing an erase operation on the user data. The secure element described above with reference to FIGS. 1 to 21 exists outside the memory controller. However, exemplary embodiments are not limited thereto. The secure element according to some exemplary embodiments may be implemented in a form embedded in the memory controller.

Figure 22:
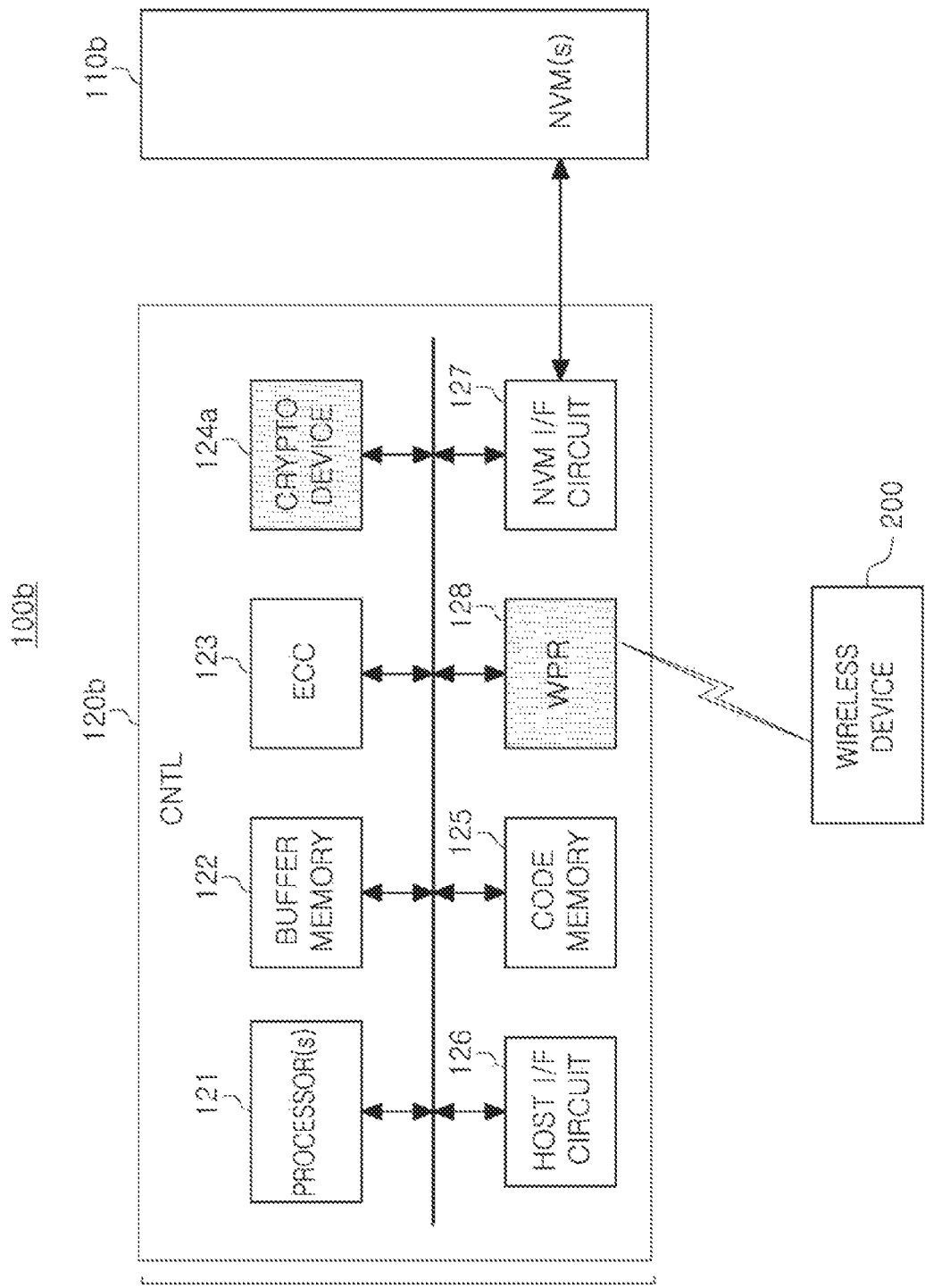
FIG. 22 is a view illustrating a storage device according to another exemplary embodiment.

FIG. 22 is a view illustrating a storage device according to another exemplary embodiment. Referring to FIG. 22, a storage device 100b may include at least one non-volatile memory device (NVM(s)) 110b and a memory controller CNTL 120b. The memory controller 120b is different from the memory controller CNTL 120 illustrated in FIG. 6 in that the memory controller 120 includes a cryptographic device CRYPTO DEVICE 124a having a function of a secure element and a wireless power receiver WPR 128 for receiving wireless power from an external wireless device 200. The cryptographic device 124a may perform a data destruction operation to delete internal data thereof in response to a data destruction signal. Here, the data destruction signal may be generated internally by an internal policy or may be received from the outside.

Figure 23:
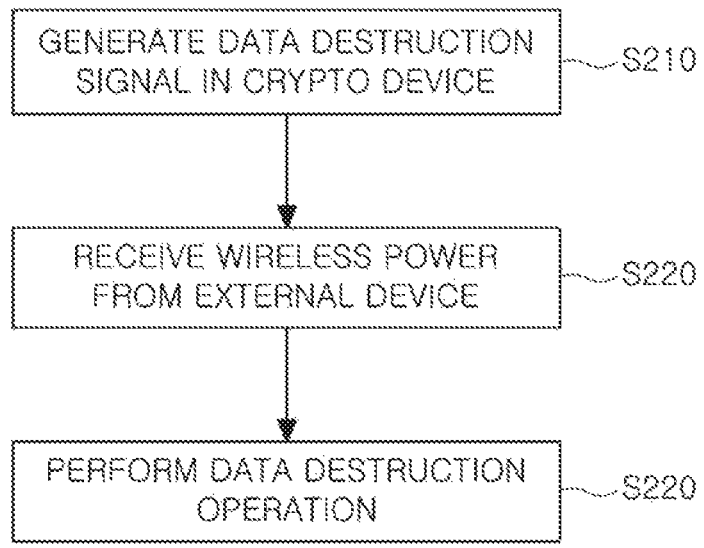
FIG. 23 is a flowchart illustrating an example of a data destruction operation of the storage device illustrated in FIG. 22.

FIG. 23 is a flowchart illustrating an example of a data destruction operation of the storage device 100b illustrated in FIG. 22. Referring to FIGS. 22 and 23, the data destruction operation of the storage device 100b may be performed as follows. The cryptographic device 124a of the memory controller 120b may generate the data destruction signal (S210). Here, the data destruction signal may be generated upon detecting damage to the memory controller 120b. The wireless power receiver 128 of the memory controller 120b may receive wireless power (S220). For example, the wireless power receiver 128 of the memory controller 120b may the receive wireless power through wireless communication and store the wireless power. The cryptographic device 124a may perform a data destruction operation (S230). For example, using the power received by the wireless power receiver 128, the cryptographic device 124a may perform the data destruction operation to internally delete important data.

Figure 24:
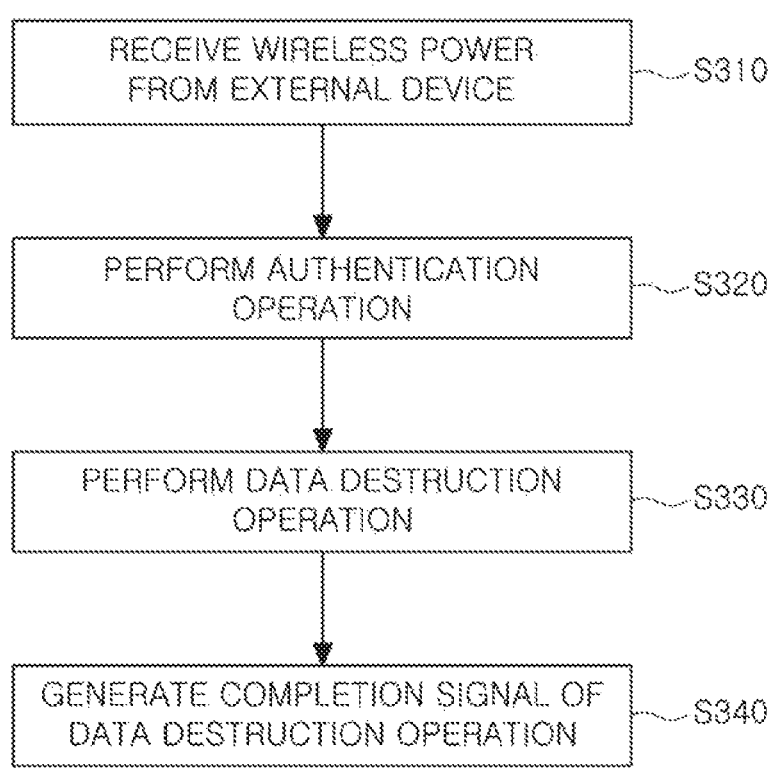
FIG. 24 is a flowchart illustrating another example of a data destruction operation of the storage device illustrated in FIG. 22.

FIG. 24 is a flowchart illustrating another example of a data destruction operation of the storage device 100b illustrated in FIG. 22. Referring to FIGS. 22 and 24, the data destruction operation of the storage device 100b may be performed as follows.

The memory controller 120b may receive wireless power from an external wireless device 200 (S310). The storage device 100b may perform an authentication operation (S320). For example, the storage device 100b may perform the authentication operation between the storage device 100b and the external wireless device 200. Here, the authentication operation may be performed using a challenge-response authentication method. Thereafter, the memory controller 120b may perform a data destruction operation (S330). For example, the memory controller 120b may perform the data destruction operation in response to a data destruction signal generated internally or received from the outside. Here, the data destruction operation may be performed on the cryptographic device 124a or may be performed on the non-volatile memory device 110b. Thereafter, when the data destruction operation is completed, the memory controller 120b may generate a completion signal of the data destruction operation (S340).

Figure 25:
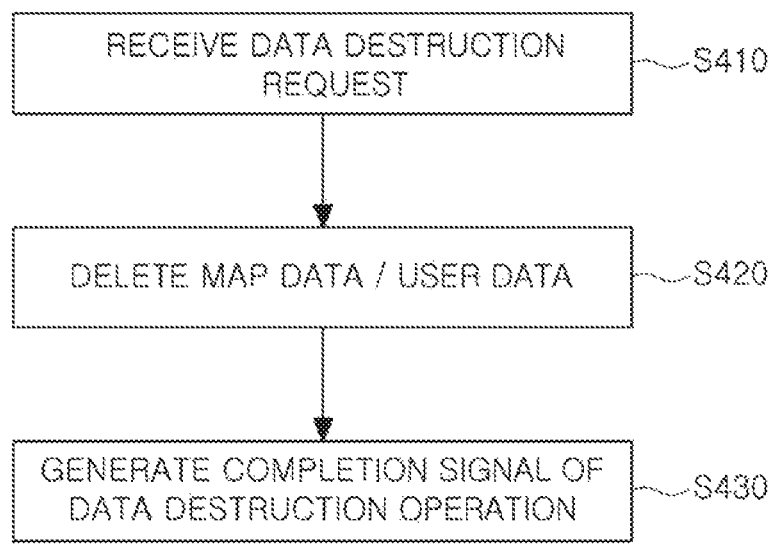
FIG. 25 is a ladder diagram illustrating a process of deleting map data/user data of a storage device according to an exemplary embodiment.

FIG. 25 is a flowchart illustrating a data destruction operation performed on a non-volatile memory device of a storage device according to an exemplary embodiment. Referring to FIG. 25, the non-volatile memory device of the storage device may perform the data destruction operation as follows.

The non-volatile memory device of the storage device may receive a data destruction request from the memory controller (S410). The non-volatile memory device may delete map data or user data in response to the data destruction request (S420). For example, the non-volatile memory device may perform an erase operation on at least one memory block storing map data or may perform an erase operation on at least one memory block storing predetermined user data. Thereafter, the non-volatile memory device may generate a completion signal for the data destruction operation (S430). The non-volatile memory device may transmit the completion signal to the memory controller.

Data destruction for data protection of a storage device 100 has been described with reference to FIGS. 1 to 25. However, exemplary embodiments are not limited to the data protection of the storage device. The technique of the present disclosure is also applicable to mobile devices.

Figure 26:
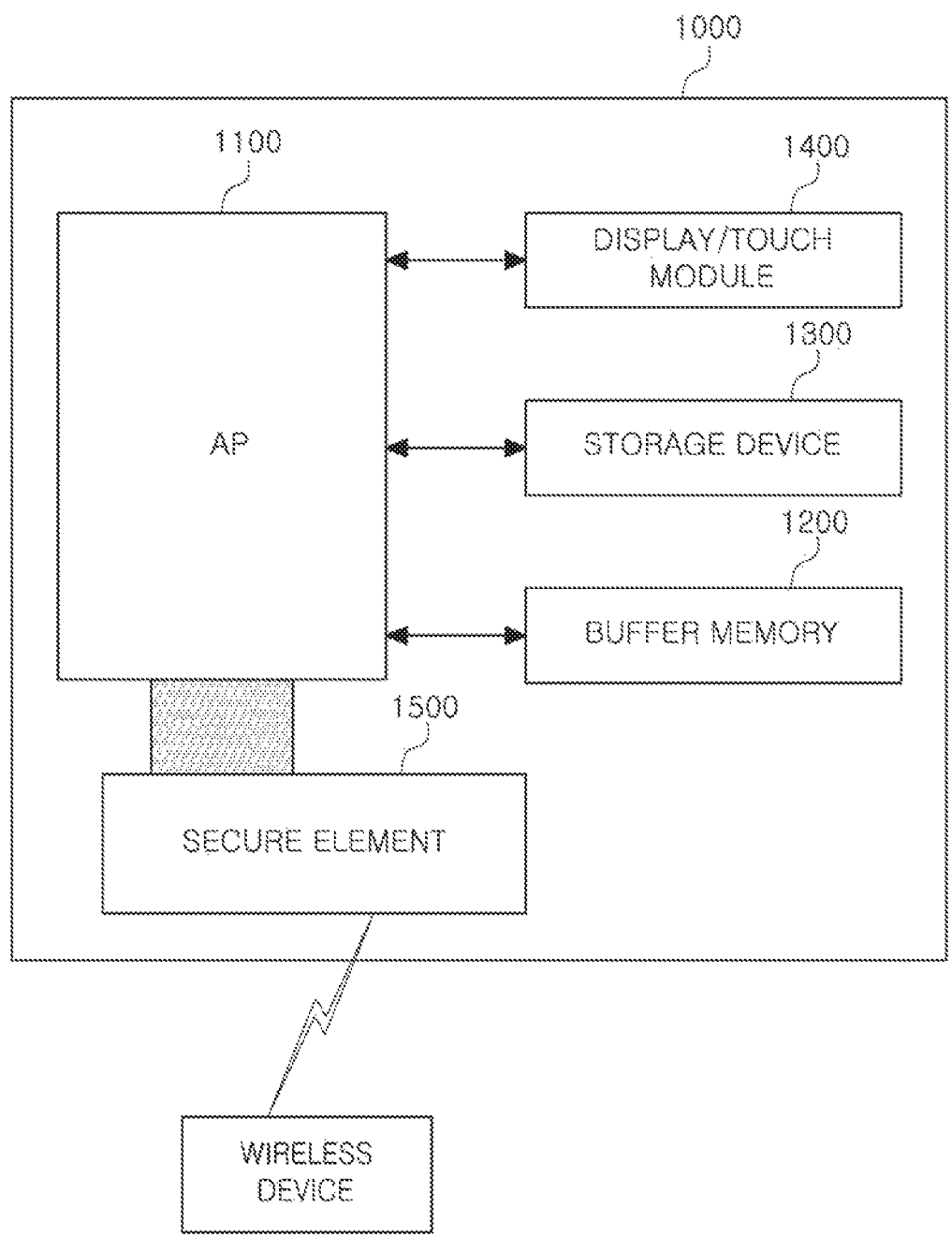
FIG. 26 is a view illustrating a mobile device according to an exemplary embodiment.

FIG. 26 is a view illustrating a mobile device according to an exemplary embodiment. Referring to FIG. 26, a mobile device 1000 may include an application processor (AP) 1100, at least one buffer memory 1200, at least one storage device 1300, a display/touch module 1400, and a secure element 1500. In some exemplary embodiments, the secure element 1500 may be a security chip. The mobile device 1000 may be realized as a laptop computer, a mobile phone, a smartphone, a tablet personal computer (PC), a wearable computer, or the like.

The application processor (AP) 1100 may be realized to control an overall operation of the mobile device 1000. The application processor 1100 may execute applications that provide Internet browsers, games, videos, or the like. In an exemplary embodiment, the application processor 1100 may include a single core or multi-core. In an exemplary embodiment, the application processor 1100 may further include a cache memory located inside or outside. In addition, the application processor 1100 may optionally include a controller, a neural processing unit (NPU), or the like.

In an exemplary embodiment, the application processor 1100 may be realized as a system-on-chip (SoC). A kernel of an operating system run on the system on a chip (SoC) may include an input/output scheduler and a device driver for controlling the storage device 1300. The device driver may control access performance of the storage device 1300 by referring to the number of synchronous queues managed by the input/output scheduler, or control the CPU mode, DVFS level, or the like in the SoC.

The buffer memory 1200 may be realized to store data necessary for the operation of the application processor 1100. For example, the buffer memory 1200 may temporarily store an operating system (OS) and application data or may be used as an execution space of various software codes. Also, the buffer memory 1200 may store data related to artificial intelligence operations. In an exemplary embodiment, the buffer memory 1200 may be realized as a DRAM or a PRAM.

The storage device 1300 may be realized to store user data. The storage device 1300 may be included in the mobile device 1000 in an embedded form. In another exemplary embodiment, the storage device 1300 may be included in the mobile device 1000 in a detachable manner.

The storage device 1300 may store data collected from at least one sensor or store data network data, augmented reality (AR)/virtual reality (VR) data, and high definition (HD) content. The storage device 1300 may include a solid state driver (SSD), an embedded multimedia card (eMMC), or the like.

The display/touch module 1400 may be realized to output data or input through a touch. For example, the display/touch module 1400 may output image data sensed using at least one sensor or output calculated data using the application processor 1100. Also, the display/touch module 1400 may recognize a user's touch.

The secure element 1500 may perform or process a general security operation of the mobile device 1000. The secure element 1500 may store important information necessary to perform the security operation. The secure element 1500 may receive wireless power through wireless communications and internally perform a data destruction operation, as described above with reference to FIGS. 1 to 26.

Meanwhile, the technique of the present disclosure is applicable to a computing system.

Figure 27:
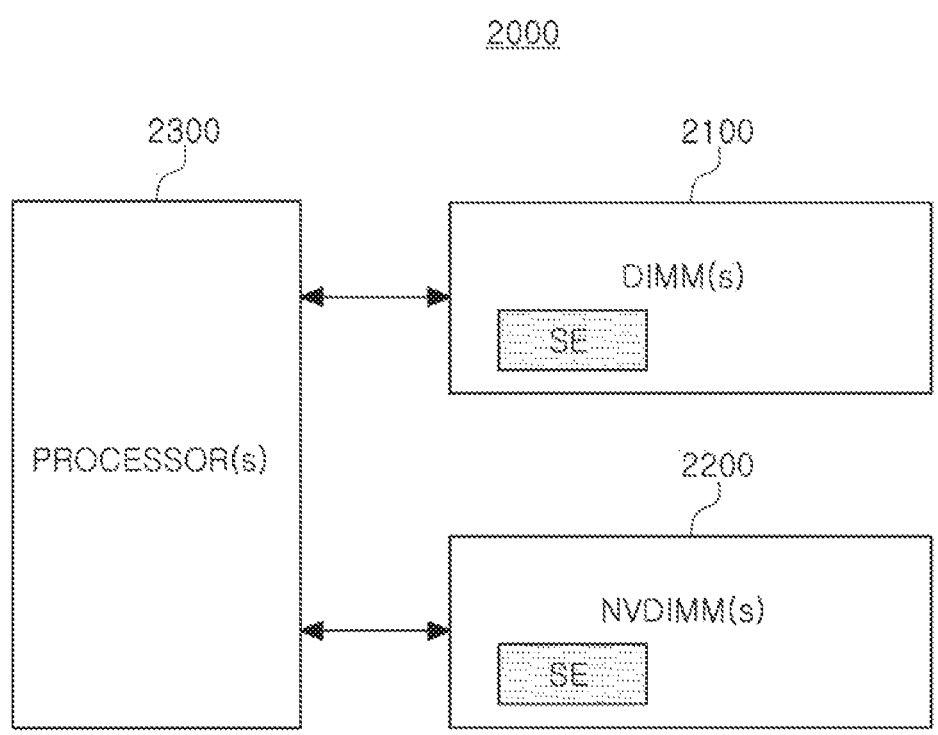
FIG. 27 is a block diagram illustrating a computing system according to an exemplary embodiment.

FIG. 27 is a block diagram illustrating a computing system according to an exemplary embodiment. Referring to FIG. 27, a computing system 2000 may include at least one memory module (DIMM(s)) 2100, at least one non-volatile memory module (NVDIMM(s)) 2200, and at least one processor 2300. Here, each of the at least one memory module 2100 and the at least one non-volatile memory module 1200 may include a secure element SE performing the data destruction operation described above.

The technique of the present disclosure is applicable to various types of computing systems (e.g., a central processing unit (CPU)/graphic processing unit (GPU)/neural processing unit (NPU) platform).

The technique of the present disclosure is applicable to an electric system safe from hacking threats.

Figure 28:
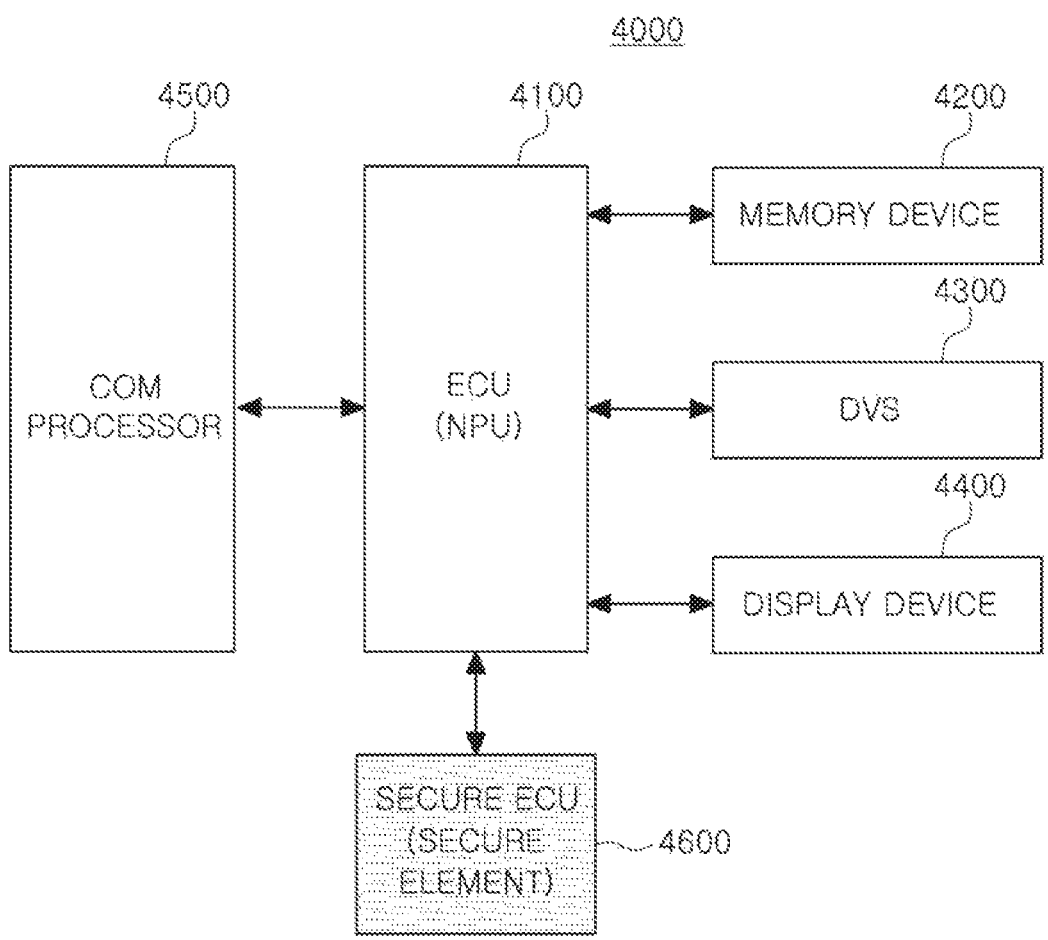
FIG. 28 is a block diagram illustrating an electric system according to an exemplary embodiment.

FIG. 28 is a block diagram illustrating an electric system according to an exemplary embodiment. Referring to FIG. 28, an electric system 4000 may include an electronic control unit (ECU) 4100, a memory device 4200, at least one dynamic range sensor (DVS) 4300, a display device 4400, a communication processor (COM PROCESSOR) 4500, and a secure ECU 4600. The electric system 4000 may be a vehicle electric system.

The ECU 4100 may be realized to control an overall operation of the electric system 4000. The ECU 4100 may process image data received from the DVS 4300. The ECU 4100 may include a neural processing unit (NPU). The NPU may quickly derive an optimal image for driving by comparing the image received from the DVS 4300 with a learning model.

The memory device 4200 may be realized to store the learning model related to an operation of the NPU. The memory device 4200 may include a volatile or non-volatile memory device. For example, the memory device 4200 may be a DRAM or a PRAM, or the like.

The DVS 4300 may be realized to detect an environment outside electric system 4000. The DVS 4300 may output an event signal in response to a change in relative light intensity. The DVS 4300 may include a pixel array including a plurality of DVS pixels and address event processors.

The display device 4400 may be realized to display the image processed by the ECU 4100 or an image transmitted by the communication processor 4500.

The communication processor 4500 may be realized to transmit the processed image to an external device, e.g., an external vehicle, or to receive an image from the external device. That is, the communication processor 4500 may be realized to communicate with the external device by wire or wirelessly.

The secure ECU 4600 may be realized to control a general operation related to security of the electric system 4000. The secure ECU 4600 may include a configuration or function of the secure element performing the data destruction operation described above with reference to FIGS. 1 to 25. In some exemplary embodiments, when the secure ECU 4600 detects a hacking threat, the secure ECU 4600 may perform a data destruction operation on internal data stored in the secure ECU.

Meanwhile, the present disclosure is applicable to a data server system.

Figure 29:
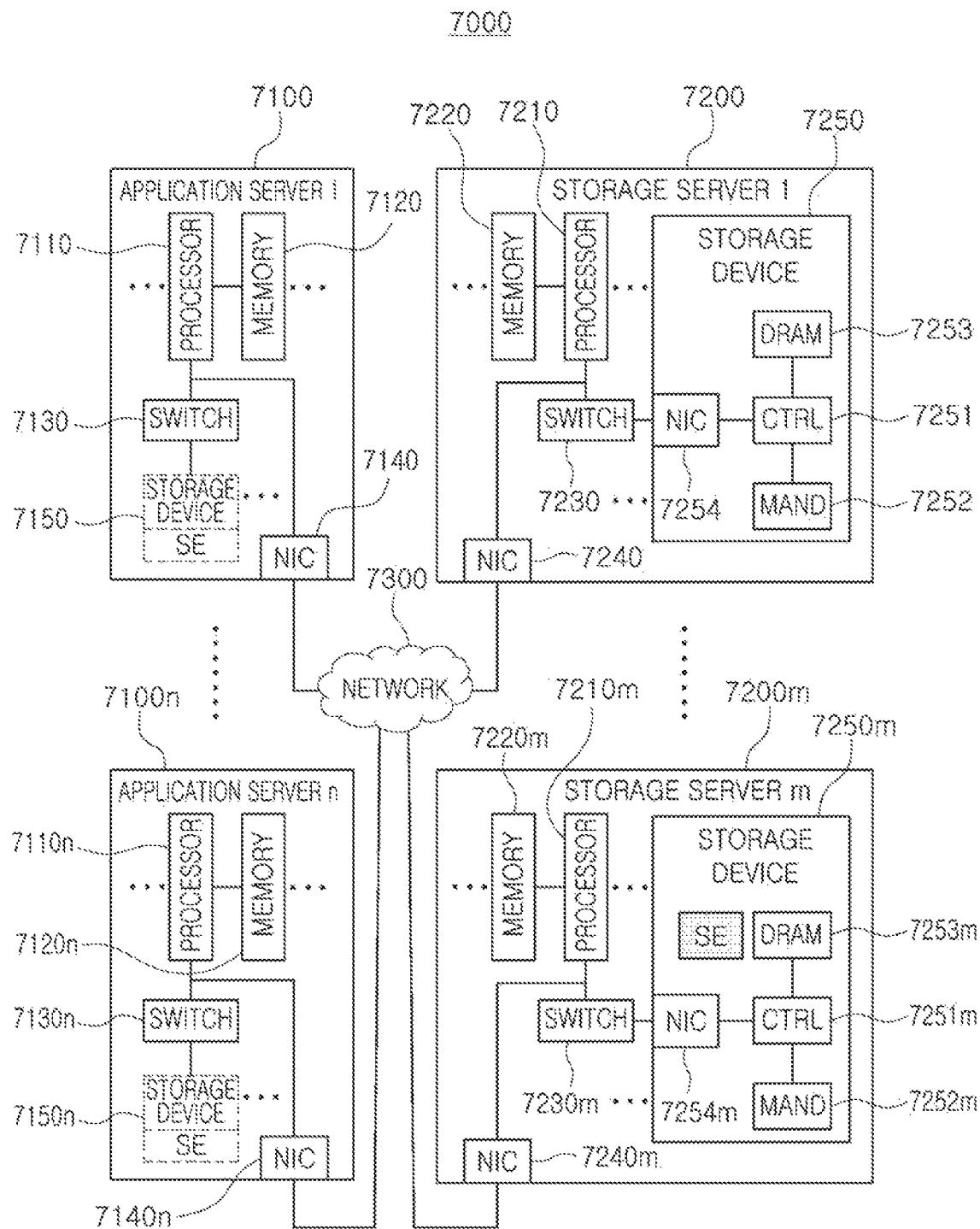
FIG. 29 is a view illustrating a data center employing a memory device according to an exemplary embodiment.

FIG. 29 is a view illustrating a data center to which a memory device according to an exemplary embodiment is applied. Referring to FIG. 29, a data center 7000 is a facility that collects various data and provides services, which may also be referred to as a data storage center. The data center 7000 may be a system for operating a search engine and a database or may be a computing system used by companies such as banks or government agencies. The data center 7000 may include application servers 7100 to 7100*n* and storage servers 7200 to 7200*m*. The number of application servers 7100 to 7100*n* and the number of storage servers 7200 to 7200*m* may be variously selected according to exemplary embodiments, and the number of application servers 7100 to 7100*n* and the number of storage servers 7200 to 7200*m* may be different from each other.

Each of the application server 7100 are the storage server 7200 may include at least one processor 7110 and 7210, respectively, and at least one memory 7120 and 7220, respectively. Referring to the storage server 7200 as an example, the at least one processor 7210 may control an overall operation of the storage server 7200 and access the at least one memory 7220 to execute instructions and/or data loaded in the at least one memory 7220. The at least one memory 7220 may be a double data rate synchronous DRAM (DDR SDRAM), a high bandwidth memory (HBM), a hybrid memory cube (HMC), a dual in-line memory module (DIMM), an optane DIMM, a non-volatile DIMM (NVMDIMM), or the like. According to an exemplary embodiment, the number of processors 7210 and the number of memories 7220 included in the storage server 7200 may be variously selected. In an exemplary embodiment, the processor 7210 and memory 7220 may provide a processor-memory pair. In an exemplary embodiment, the number of the processor 7210 and the memory 7220 may be different from each other. The processor 7210 may include a single-core processor or a multi-core processor. The above description of the storage server 7200 may be similarly applied to the application server 7100. According to some exemplary embodiments, the application server 7100 may omit a storage device 7150. According to some exemplary embodiments, the storage server 7200 may include at least one storage device 7250. The number of storage devices 7250 included in the storage server 7200 may be variously selected according to exemplary embodiments.

The application servers 7100 to 7100*n* and the storage servers 7200 to 7200*m* may communicate with each other through a network 7300. The network 7300 may be realized using a fiber channel (FC) or Ethernet. Here, FC may be a medium used for relatively high-speed data transmission, and may be an optical switch that provides high performance/high availability. Depending on an access method of the network 7300, the storage servers 7200 to 7200*m* may be provided as a file storage, a block storage, or an object storage.

In an exemplary embodiment, the network 7300 may be a storage-only network such as a storage area network (SAN). For example, the SAN may be an FC-SAN which uses an FC network and is realized according to an FC protocol (FCP). As another example, the SAN may be an IP-SAN which uses a TCP/IP network and is realized according to an iSCSI (SCSI over TCP/IP or Internet SCSI) protocol. In other exemplary embodiments, the network 7300 may be a general network such as a TCP/IP network. For example, the network 7300 may be realized according to protocols such as FC over Ethernet (FCoE), network attached storage (NAS), NVMe over Fabrics (NVMe-oF), or the like.

Hereinafter, the application server 7100 and the storage server 7200 will be mainly described. The description of the application server 7100 may also be applied to other application servers 7100*n*, and the description of the storage server 7200 may also be applied to other storage servers 7200*m*.

The application server 7100 may store data, which is requested to be stored by the user or a client, in one of the storage servers 7200 to 7200*m* through the network 7300. In addition, the application server 7100 may acquire data, which is requested to be read by the user or the client, from one of the storage servers 7200 to 7200*m* through the network 7300. For example, the application server 7100 may be realized as a web server, a database management system (DBMS), or the like.

The application server 7100 may access a memory 7120*n* or a storage device 7150*n* included in another application server 7100*n* through the network 7300 or access the memories 7220 to 7220*m* or storage devices 7250 to 7250*m* included in the storage servers 7200 to 7200*m* through the network 7300. Accordingly, the application server 7100 may perform various operations on data stored on the application servers 7100 to 7100*n* and/or storage servers 7200 to 7200*m*. For example, the application server 7100 may execute a command to move or copy data between the application servers 7100 to 7100*n* and/or the storage servers 7200 to 7200*m*. Here, the data may be moved directly from the storage devices 7250 to 7250*m* of the storage servers 7200 to 7200*m* to the memories 7120 to 7120*n* of the application servers 7100 to 7100*n* or via the memories 7220 to 7220*m* of the storage servers 7200 to 7200*m*. The data moved through the network 7300 may be encrypted data for security or privacy.

Referring to the storage server 7200 as an example, an interface (NIC) 7254 may provide a physical connection between the processor 7210 and a controller 7251 and a physical connection between an NIC 7240 and the controller 7251. For example, the interface 7254 may be realized by a direct attached storage (DAS) method that directly accesses the storage device 7250 by a dedicated cable. In addition, for example, the interface 7254 may be realized by various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (e-MMC), universal flash storage (UFS), embedded universal flash storage (eUFS), compact flash (CF) card interface.

The storage server 7200 may further include a switch 7230 and the NIC 7240. The switch 7230 may selectively connect the processor 7210 and the storage device 7250 under the control of the processor 7210 or selectively connect the NIC 7240 and the storage device 7250.

In an exemplary embodiment, the NIC 7240 may include a network interface card, a network adapter, or the like. The NIC 7240 may be connected to the network 7300 by a wired interface, a wireless interface, a BLUETOOTH™ interface, an optical interface, or the like. The NIC 7240 may include an internal memory, a DSP, a host bus interface, or the like and may be connected to the processor 7210 and/or the switch 7230 through the host bus interface. The host bus interface may be realized as one of the examples of the interface 7254 described above. In an exemplary embodiment, the NIC 7240 may be incorporated with at least one of the processor 7210, the switch 7230, and the storage device 7250.

In the storage servers 7200 to 7200m or the application servers 7100 to 7100n, the processor may transmit a command to the storage devices 7130 to 7130n and 7250 to 7250m or the memories 7120 to 7120n and 7220 to 7220m to program data or read data. Here, the data may be data error-corrected through an error correction code (ECC) engine. The data may be data which has undergone data bus inversion (DBI) or data masking (DM) and may include cyclic redundancy code (CRC) information. The data may be data encrypted for security or privacy.

The storage devices 7150 to 7150n and 7250 to 7250m may transmit a control signal and a command/address signal to NAND flash memory devices 7252 to 7252m in response to a read command received from the processor. Accordingly, when data is read from the NAND flash memory devices 7252 to 7252m, a read enable (RE) signal may be input as a data output control signal to serve to output data to a DQ bus. A data strobe (DQS) may be generated using the RE signal. The command and address signal may be latched to a page buffer according to a rising edge or a falling edge of a write enable (WE) signal.

The controller 7251 may control an overall operation of the storage device 7250. In an exemplary embodiment, the controller 7251 may include a static random access memory (SRAM). The controller 7251 may write data into the NAND flash 7252 in response to a write command or may read data from the NAND flash 7252 in response to a read command. For example, the write command and/or read command may be provided from the processor 7210 in the storage server 7200, the processor 7210m in another storage server 7200m, or the processors 7110 to 7110n in the application servers 7100 to 7100n. A DRAM 7253 may temporarily store (buffer) the data written into the NAND flash 7252 or data read from the NAND flash 7252. Also, the DRAM 7253 may store meta data. Here, the meta data includes user data or data generated by the controller 7251 to manage the NAND flash 7252. The storage device 7250 may include a secure element (SE) for security or privacy. The secure element (SE) shown in FIG. 29 exists outside the memory controller, but exemplary embodiments are not limited thereto. In some exemplary embodiments, the secure element (SE) may be embedded in the memory controller.

The storage device according to an exemplary embodiment may include a structure that causes damage in an integrated circuit (IC) by a user's physical force by connecting each structure to the secure element.

In addition, the storage device according to an exemplary embodiment may include a structure for attaching identification information such as a barcode/QR/RFID to an extraction structure of the storage device and the secure element.

In addition, the storage device according to an exemplary embodiment may include an antenna attachment structure for wireless power communication in the storage device.

The contents of the present disclosure described above are merely specific exemplary embodiments for carrying out the disclosure. The present disclosure may include technical ideas that are abstract and conceptual ideas that may be utilized as future technologies, as well as the concrete and practical available means.

As set forth above, according to exemplary embodiments of the present disclosure, the storage device and the data destruction method thereof may safely and easily perform a data destruction operation by deleting the internal data of a secure element.

In addition, the storage device and data destruction method thereof according to an exemplary embodiment may realize data destruction at low cost by performing the data destruction operation using a secure element.

While exemplary embodiments have been shown and described above, it will be apparent to those skilled in the art that modifications and variations could be made without departing from the scope of the present disclosure as defined by the appended claims.

What is claimed is:

1. A storage device comprising:
at least one non-volatile memory device; and
a memory controller configured to control the at least one non-volatile memory device,
wherein the memory controller includes:
at least one processor configured to control operation of the storage device;
a buffer memory configured to temporarily store data;
an error correcting circuit configured to generate a first error correction code of first data in a write operation and to generate second data using a second error correction code in a read operation;
a cryptographic module configured to generate the first data by encrypting data using an encryption algorithm in the write operation or to decrypt the second data using the encryption algorithm in the read operation, and to perform a data destruction operation in response to a data destruction signal;
a code memory configured to store code data for operating the memory controller;
a host interface circuit configured to provide an interface function with an external device;
a non-volatile memory interface circuit configured to provide an interface function with the at least one non-volatile memory device; and
a wireless power receiver configured to receive wireless power from an external wireless device and to provide the wireless power to the cryptographic module when performing the data destruction operation.

2. The storage device of claim 1, wherein
the data destruction signal is generated by an internal policy of the memory controller.

3. The storage device of claim 1, wherein
the data destruction signal is received by wire or wirelessly from the external device.

4. The storage device of claim 1, wherein
the data destruction operation includes destroying key information for performing the encryption algorithm.

5. The storage device of claim 1, wherein
the data destruction operation includes deleting map data of the at least one non-volatile memory device or deleting user data.

6. The storage device of claim 1, wherein the cryptographic module performs the data destruction operation using the wireless power that is received from the wireless power receiver.

7. A method of destructing data of a storage device, the method comprising:
receiving wireless power from an external wireless device that is external to the storage device;
receiving a data destruction signal from the external wireless device; and
performing a data destruction operation using the received wireless power, in response to the data destruction signal.

8. The method of claim 7, wherein
the performing the data destruction operation includes destroying key information required for an encryption and decryption operation.

9. The method of claim 8, wherein
the destroying the key information includes overwriting security data on a memory storing the key information.

10. The method of claim 8, wherein
the destroying the key information includes performing an erasing operation on a memory storing the key information.

11. The method of claim 7, further comprising:
transmitting a completion signal to the external wireless device after the data destruction operation is completed.

12. The method of claim 7, further comprising:
receiving an authentication request signal from the external wireless device;
performing an authentication operation on the external wireless device in response to the authentication request signal; and
performing the data destruction operation after the authentication operation is completed.

13. The method of claim 7, wherein
the performing the data destruction operation includes deleting data of at least one non-volatile memory device.

14. The method of claim 13, wherein
the deleting the data includes deleting map data of the at least one non-volatile memory device.

15. The method of claim 14, wherein
the deleting the map data includes overwriting the map data or performing an erase operation on the map data.

16. The method of claim 13, wherein
the deleting the data includes deleting user data of the at least one non-volatile memory device.

17. The method of claim 16, wherein
the deleting the user data includes overwriting the user data or performing an erase operation on the user data.

* * * * *